United States Patent [19]
Watanabe et al.

[11] Patent Number: 5,112,205
[45] Date of Patent: May 12, 1992

[54] OPTICAL-DISK MANUFACTURING APPARATUS

[75] Inventors: Hidetoshi Watanabe, Ibaragi; Hirotsugu Suzuki, Chiba; Masanobu Yamamoto, Kanagawa, all of Japan

[73] Assignee: Sony Corporation, Tokyo, Japan

[21] Appl. No.: 519,398

[22] Filed: May 4, 1990

[30] Foreign Application Priority Data

May 15, 1989 [JP] Japan .................................. 1-121073
May 17, 1989 [JP] Japan .................................. 1-123680

[51] Int. Cl.⁵ ............................................. B29D 17/00
[52] U.S. Cl. ..................................... 425/111; 414/225; 414/737; 414/744.8; 425/174.4; 425/810
[58] Field of Search ................ 264/106, 107; 414/225, 414/737, 744.2, 744.8, 752, 797.8; 425/3, 110, 111, 810, 174.4

[56] References Cited

U.S. PATENT DOCUMENTS

| | | | |
|---|---|---|---|
| 3,776,393 | 12/1973 | Bargstedt | 414/737 |
| 4,501,527 | 2/1985 | Jacoby et al. | 414/225 |
| 4,529,353 | 7/1985 | Dean et al. | 414/225 |
| 4,778,331 | 10/1988 | Kimata et al. | 414/225 |
| 4,846,623 | 7/1989 | Otani et al. | 414/225 |
| 4,907,931 | 3/1990 | Mallory et al. | 414/752 |
| 4,907,956 | 3/1990 | Ezaki et al. | 425/110 |
| 4,915,564 | 4/1990 | Eror et al. | 414/737 |

FOREIGN PATENT DOCUMENTS

0118143 9/1984 European Pat. Off. .
0047645 3/1992 European Pat. Off. .
1105480 3/1968 United Kingdom .

OTHER PUBLICATIONS

Patent Abstracts of Japan, vol. 9, No. 279 (Hirano) Nov. 1985.

Primary Examiner—Jay H. Woo
Assistant Examiner—C. Scott Bushey
Attorney, Agent, or Firm—Lewis H. Eslinger; Jay H. Maioli

[57] ABSTRACT

In an optical-disk manufacturing device in which a disklike plate is coated with an ultraviolet-set resin at one side thereof, pressed against a stamper, and irradiated by ultraviolet rays to transfer a pattern provided in the stamper to the ultraviolet-set resin, the optical-disk manufacturing device has a disklike-plate supplying section which can store a plurality of disklike plates; a resin supplying section for supplying the resin to the disklike plate; a transfer section for transferring the pattern of the stamper to the resin; a disklike-plate removing section for removing the disklike plate after transferring; and a transport device to transport the disklike plate from each proceding part to each following part. The various section of the device are arranged in alignment with a central line passing through a first position of the transfer section, where the disklike plate is overlaid upon the stamper, and at least a second position of the transfer section, where the resin sandwiched between the disklike plate and the stamper is irradiated by the ultraviolet rays is substantially vertical to the alignment of the sections of the manufacturing device.

11 Claims, 29 Drawing Sheets

FIG.1A
PRIOR ART
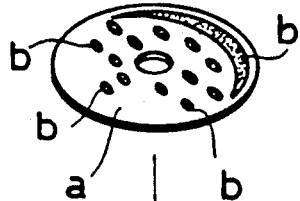
FIG.1B
PRIOR ART
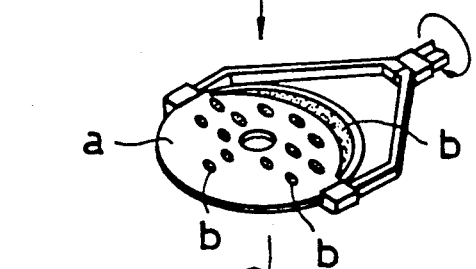
FIG.1C
PRIOR ART
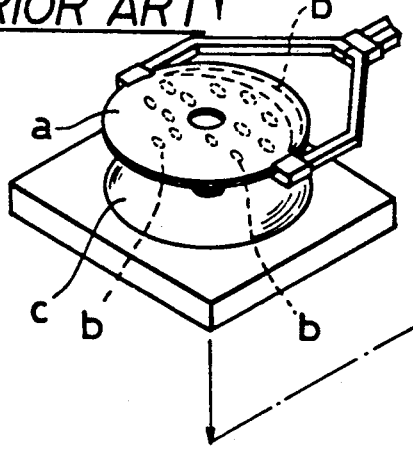
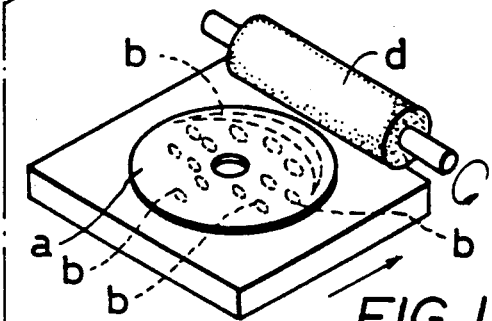
FIG.1D
PRIOR ART
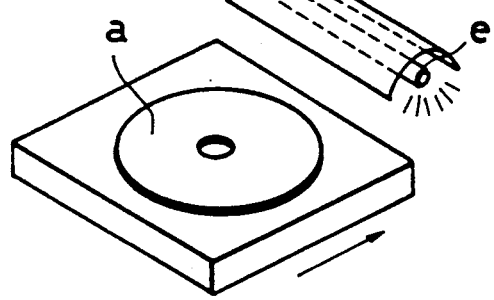
FIG.1E
PRIOR ART
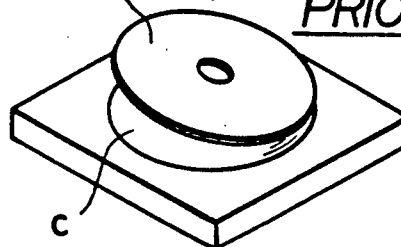
FIG.1F
PRIOR ART
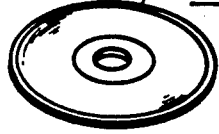
FIG.1G
PRIOR ART

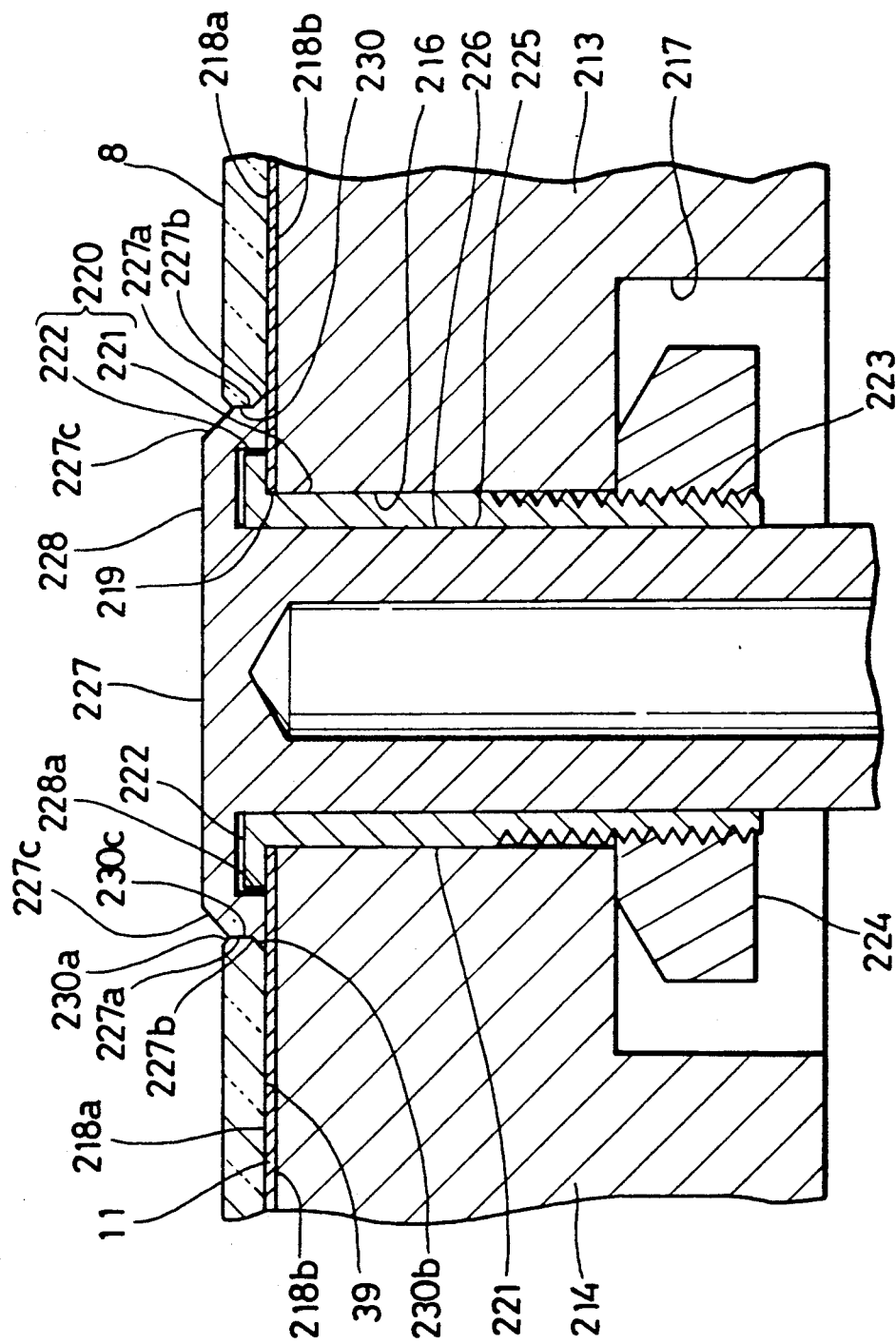

OPTICAL-DISK MANUFACTURING APPARATUS

BACKGROUND OF THE INVENTION

1. Field of the Invention

This invention relates to an optical-disk manufacturing device in which a side of a transparent plate, which is to be coated with a liquid resin, is pressed against a stamper, and irradiated by ultraviolet rays through the transparent plate so as to set the liquid resin, a pattern provided in the stamper, thus, being transferred to the cured resin separated from the stamper.

2. Description of the Prior Art

To manufacture an optical disk, such as a compact disk (CD) or a laser disk (LD, LVD), various kinds of methods have been disclosed so far, and a so-called photo polymerization method (hereinafter denoted by 2P method) is one of these methods.

According to the 2P method, the optical disk is made of ultraviolet-set resin. As shown in FIG. 1B, one side of a disklike transparent plate a (FIG. 1A), such as a glass plate, is coated with the liquid resin b, and as shown in FIG. 1C, the coated side of the transparent plate a is brought into contact with a stamper c Then, the plate a is pressed against the stamper c by a roller d (FIG. 1D), so far that the liquid resin is evenly distributed between the plate a and the stamper c.

As shown in FIG. 1E, the liquid resin b is irradiated by ultraviolet rays which are emitted by a lamp e through the transparent plate a so as to set the liquid resin, and as shown in FIG. 1F, the cured resin b is separated from the stamper c. Thus, the pattern provided on the stamper is transferred on a surface of the cured resin. Thereafter, the cured resin is metallized and coated with a protective film to obtain an optical disk f shown in FIG. 1G.

The 2P method has such features that the liquid resin is able to penetrate into pits of the pattern of the stamper even when the pattern is very minute, and further, a glass plate, which is better in optical characteristics than a plate of synthetic resin like polycarbonate, can be used as the transparent plate.

The transparent plate a must be transported from a position where a proceding process is performed, to another position where a following process is performed during the manufacture of the optical disk. For example, the transparent plate a is transported to a position where the ultraviolet-set resin is supplied on the side of the transparent plate, while the plate a coated with the resin is taken out from the above position.

Exemplified in FIGS. 2 and 3 are the steps in the procedure in which the resin is supplied to the transparent plate, and a transport mechanism to transport the transparent plate before and after the step. A screen i having predetermined apertures h is stretched over a frame g, and under the frame g, a backboard k is arranged. Further, provided at the center of the backboard k is a disk setting portion 1.

After the transparent plate a is mounted in the disk setting portion 1, the frame g with the screen i is overlaid upon the backboard k, and the liquid resin b supplied from above to the screen i is spread over by a squeegee j, which is moved to press the screen i. Thus, when the screen i is raised, the liquid resin b is left in positions corresponding to the respective positions of the apertures h. The height of the left liquid resin b is substantially the same as the thickness of the screen i.

The transparent plate a is mounted in and taken out from the disk setting portion 1 of the backboard k by a transport mechanism m. An arm n of the transport mechanism m is rotatably supported at one end thereof, and movable upwards and downwards. Secured to the other end of the arm n is a suction head o, and from the suction head o, a plurality of suction tubes p, which have respective suction ports (not shown), project downwards. The suction head o is connected to a suction device (not shown).

When the arm n is rotated so far that the suction head o is brought to a position just over a disklike-plate supplying part of an optical-disk manufacturing device, the arm n is moved downwards to a position where the central part of a disklike plate a is attracted to the suction head o by suction. Then, the arm n is raised and rotated so far that the suction head o is brought to a position just over the disk setting portion 1 of the backboard k. The arm n is thereafter lowered so as to mount the disklike plate a in the disk setting portion 1 of the backboard k. After the suction is ceased to separate the suction head o from the disklike plate a, the arm n is raised and rotated so as to bring the suction head o to a predetermined position.

After the disklike plate a is coated with the ultraviolet-set resin b, the central part of the disklike plate a is again attracted to the suction head o so as to take out the disklike plate a from the disk setting portion 1 of the backboard k.

As may be seen from the above description, the suction head o sticks to the coated side of the disklike plate a, so that a stain caused by the suction head o is apt to remain on the coated side of the disklike plate a, and to be dissolved in the liquid resin b. This causes such troubles that errors are produced when recording or reproducing of signals is performed, the metallized portion of the disklike plate easily corrodes, and the adhesive strength of the cured resin to the disklike plate decreases.

Moreover, the disklike plate a is apt to cause an undesirable displacement with respect to the stamper c when pressed against the stamper c during the manufacture of the optical disk. That is, as a stamping bed g, to which the stamper c is secured, is moved in a direction of arrow s see FIG. 4, the roller d abutting one end a1 of the disklike plate a is rolled in a direction of arrows t, so that the disklike plate a begins to be pressed against the stamper c under such a state that the other end a2 of the disklike plate a is spaced away from the stamper c. Thus, the disklike plate a is easily displaced in a direction of arrow u with respect to the stamper c due to friction between the disklike plate a and the roller d.

As a result, the disklike plate a sometimes rides on a projected core r of the stamper c, and is deformed or broken by the pressure of the roller d. The stamper c is also apt to be damaged. Sometimes, the disklike plate a does not completely come into contact with the stamper c due to shear between the disklike plate a and the stamper c, so that the liquid resin b does not completely penetrate into the pits of the stamper c, and further, locally has some foam. Thus, it becomes difficult to obtain a good transfer.

Such being the case, a shear detecting device, such as a photosensor, has been used to detect the shear between the disklike plate a and the stamper c. However, such device is not only expensive but also useless to preventing the disklike plate a from displacing with respect to the stamper c.

OBJECTS AND SUMMARY OF THE INVENTION

Accordingly, it is an object of the present invention to provide an optical-disk manufacturing device in which the transfer side of a disklike plate, which is coated with a resin in order to transfer a pattern provided in a stamper, is kept clean while the disklike plate is transported by a disk transport device from a position where a preceding process is performed to another position where a following process is performed.

Another object of the invention is to provide an optical-disk manufacturing device in which a disklike plate, which is coated with a resin in order to transfer a pattern provided in a stamper, is not displaced with respect to a stamper while the disklike plate is pressed against the stamper by a roller.

A further object of the invention is to provide an optical-disk manufacturing device in which a sliding surface of a movable mechanism for separating a disklike plate from a stamper is prevented from wear damage, and at the same time, the stamper is also prevented from being separated from a bed to which the stamper is secured.

In accordance with an aspect of this invention, a backboard having a disk setting portion has a curved slot which extends from the center of the disk setting portion to a side of the backboard, and a suction head provided in a disk transport device can reach the center of the disk setting portion from the outside of the backboard after passing through the cut passage. Thus, a disklike plate can be mounted in and/or demounted from the disk setting portion of the backboard under such a state that the suction head of the disk transport device is attracted to a side of the disklike plate, which faces the disk setting portion, so that the other side of the disklike plate, which is not in contact with the disk setting portion, is kept clean since the disklike plate is transported without any contact of the disk transport device with the other side of the disklike plate.

Moreover, the disklike plate is put on the stamper, and then, pressed a little against the stamper by the disk transport device before it is pressed by a roller, so that the disklike plate comes uniformly close to the stamper, and a liquid resin sandwiched between the disklike plate and the stamper is sufficiently spreaded between them. Thus, the disklike plate is not displaced with respect to the stamper when pressed by the roller, because the shear resistance of the liquid resin prevents the disklike plate from being displaced.

The above, and other objects, features and advantages of this invention, will be apparent from the following detailed description of illustrative embodiments thereof to be read in connection with the accompanying drawings wherein like reference numerals identify the same or corresponding parts in the several views.

BRIEF DESCRIPTION OF THE DRAWINGS

FIGS. 1A to 1G are schematic perspective views showing a method of manufacturing a conventional optical disk;

FIGS. 2 and 3 are perspective views of a part of a conventional optical-disk manufacturing device, in which FIG. 2 is a schematic perspective view of a resin supplying section, and FIG. 3 is a schematic perspective view of a disklike-plate transport device;

FIGS. 19A and 19B are enlarged sectional views showing the main part of the stamper mounting structure;

DETAILED DESCRIPTION OF THE PREFERRED EMBODIMENTS

An optical-disk manufacturing device of the present invention will be described in detail with reference to the accompanying drawings.

Figure 2:
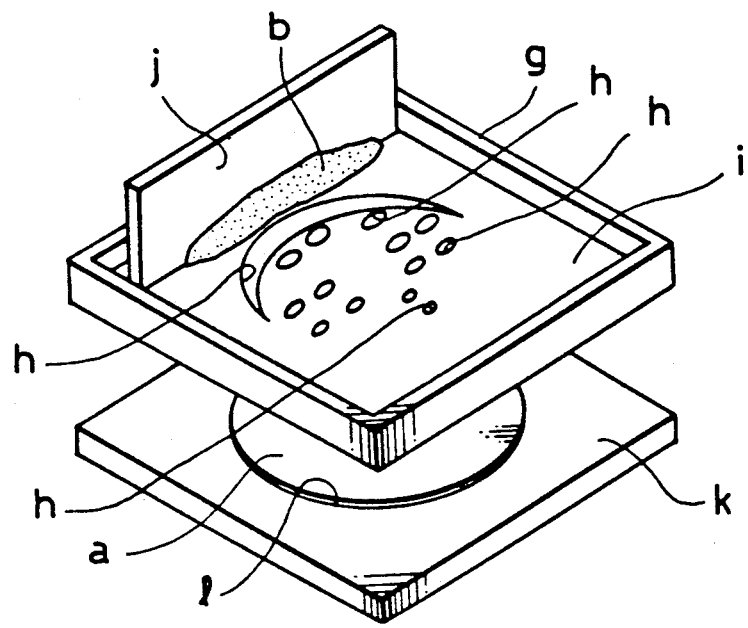
Figure 3:
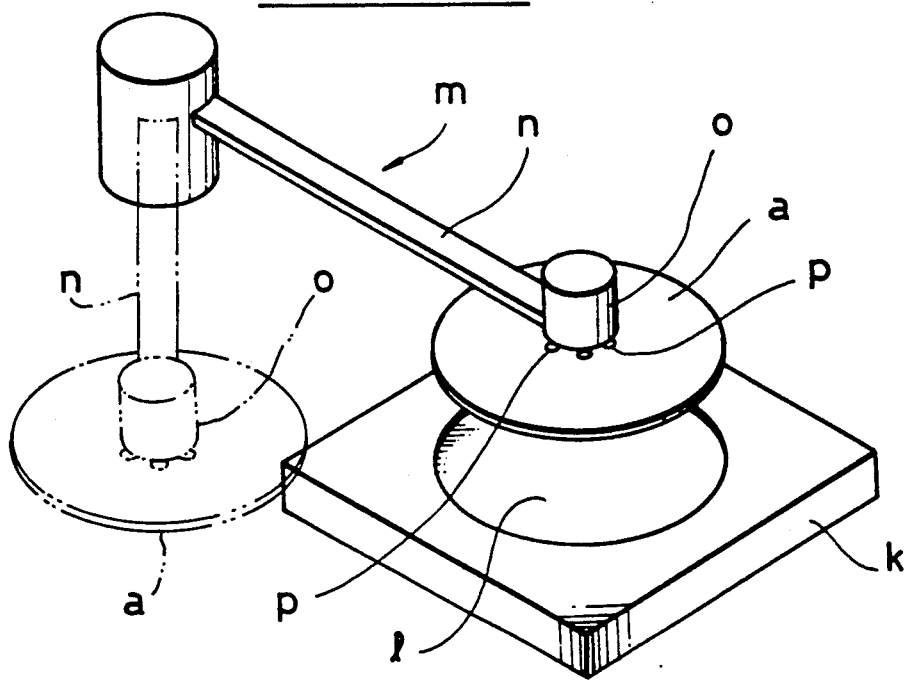
Figure 4:
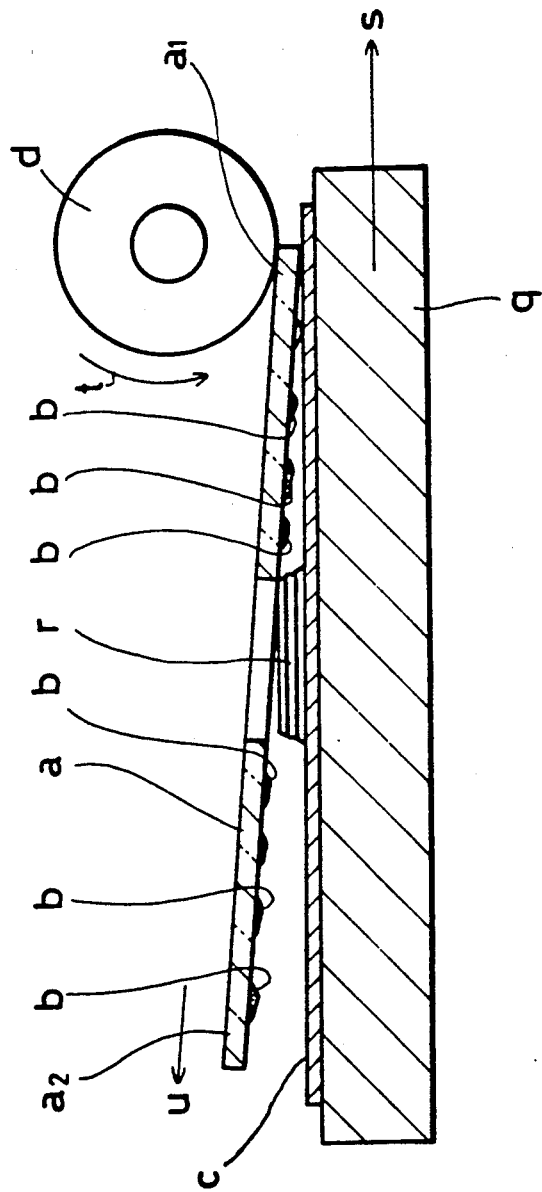
FIG. 4 is a view for explaining problems posed when a transfer operation is performed in the conventional optical-disk manufacturing device.
Figure 5:
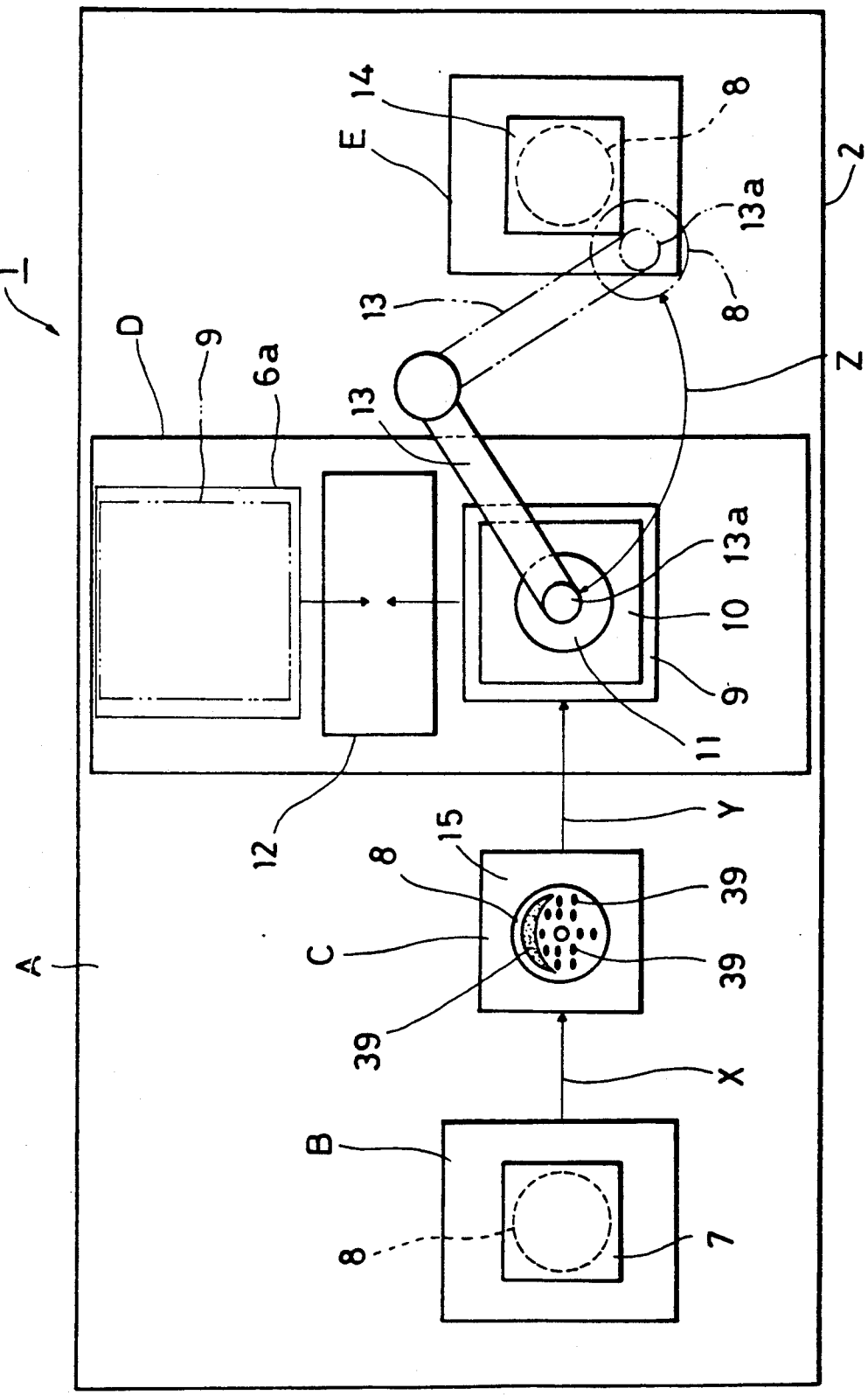
FIG. 5 is a schematic block diagram showing an overall optical-disk manufacturing device of the present invention.

As shown in FIG. 5, in the optical-disk manufacturing device, a disklike-plate supplying section B, an (ultraviolet-set) resin supplying section C, a transfer section D and a disklike-plate removing section E are arranged on a bed A in a line. A first disklike-plate transport device X is arranged between the disklike-plate supplying section B and the resin supplying section C; a second disklike-plate transport device Y, is arranged between the resin supplying section C and the transfer section D; and a third disklike-plate transport device Z exists between the transfer section D and the disklike-plate removing section E.

An optical disk is manufactured by the following procedure.

A case 7 is placed on the disklike-plate supplying section B. A plurality of disklike plates 8 are housed in the case 7 (see FIGS. 10 and 11). The disklike plates 8 are transported one by one from the case 7 to the resin supplying section C by the first disklike-plate transport device X.

In the resin supplying section C, the disklike plate 8 is placed on a fixed table 15, and an ultraviolet-set resin 39 is supplied to the disklike plate 8. The disklike plate 8 to which the ultraviolet-set resin 39 is supplied is transported to the transfer section D by the second disklike-plate transport device Y.

In the transfer section D, the disklike plate 8 is placed on a stamper 11 with the surface to which the ultraviolet-set resin 39 is supplied facing down. The ultraviolet-set resin 39 is clamped between the stamper 11 and the disklike plate 8.

When the disklike plate 8 is placed on the stamper 11, a movable table 9 is moved upwards, as shown in FIG. 5. While the movable table 9 passes through a pressing device 12 in the process, the disklike plate 8 is urged against the stamper 11 so that the ultraviolet-set resin 39 is uniformly filled in small recesses of the stamper 11. Ultraviolet rays are then radiated from the disklike plate 8 side by means of an ultraviolet irradiated section 6a, and the ultraviolet-set resin 39 is cured. When curing of the ultraviolet-set resin 39 is completed, the movable table 9 is moved downwards, as shown in FIG. 5, and returns to the original position.

Subsequently, the disklike plate 8 is separated from the stamper 11 together with the set resin 39 by a suction head 13a of an arm 13 of the third disklike-plate transport device Z, and is transported to the disklike-plate removing section E so as to be housed in a case 14 for removal.

Since the pressing device 12 and the ultraviolet irradiated section 6a of the transfer part D are arranged to be substantially perpendicular to the path constituted by the disklike-plate supplying section B, the resin supplying section C and the disklike-plate removing section E, the overall apparatus can be reduced in size.

Figure 6:
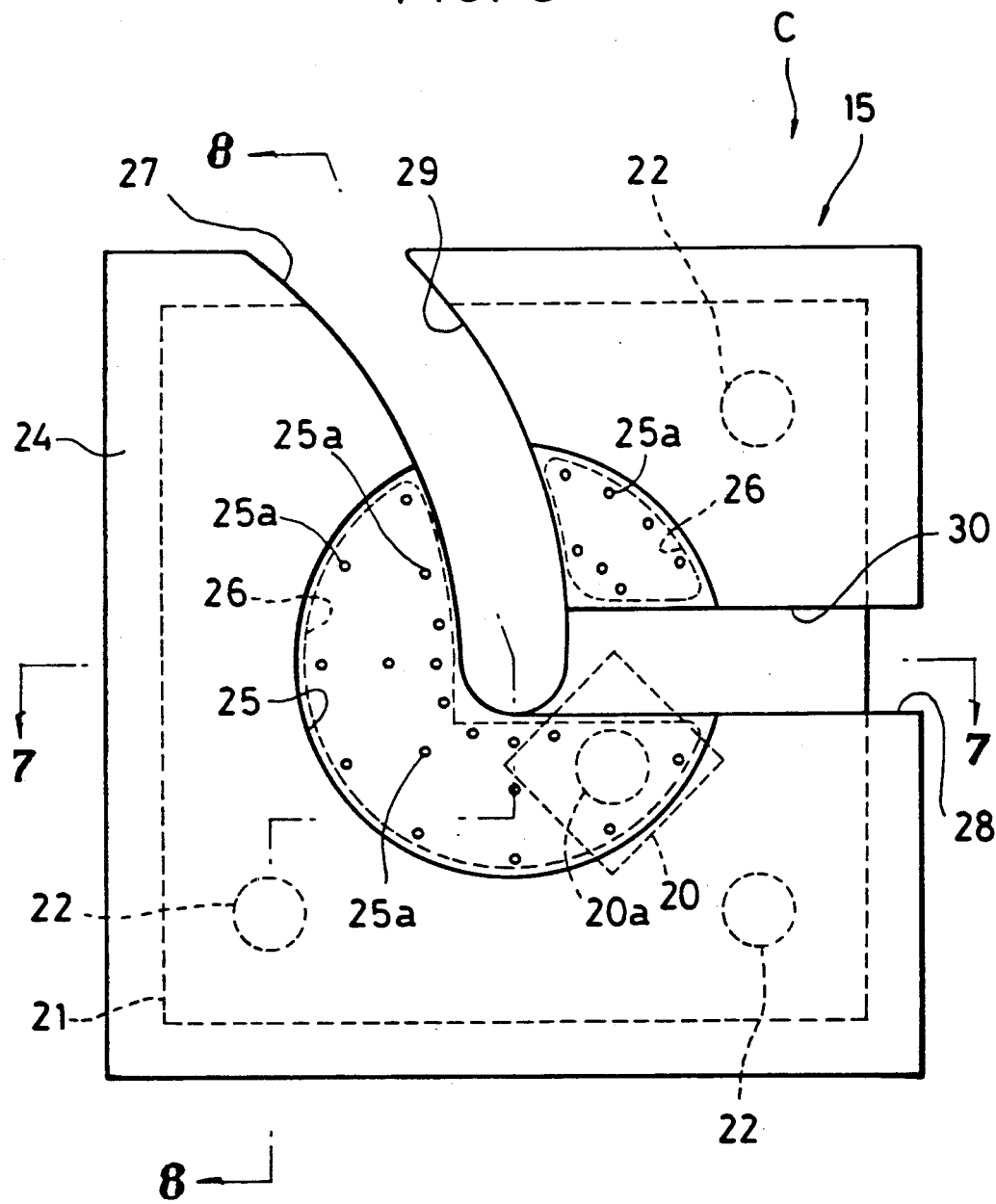
FIG. 6 is a plan view of a resin supplying section.
Figure 7:
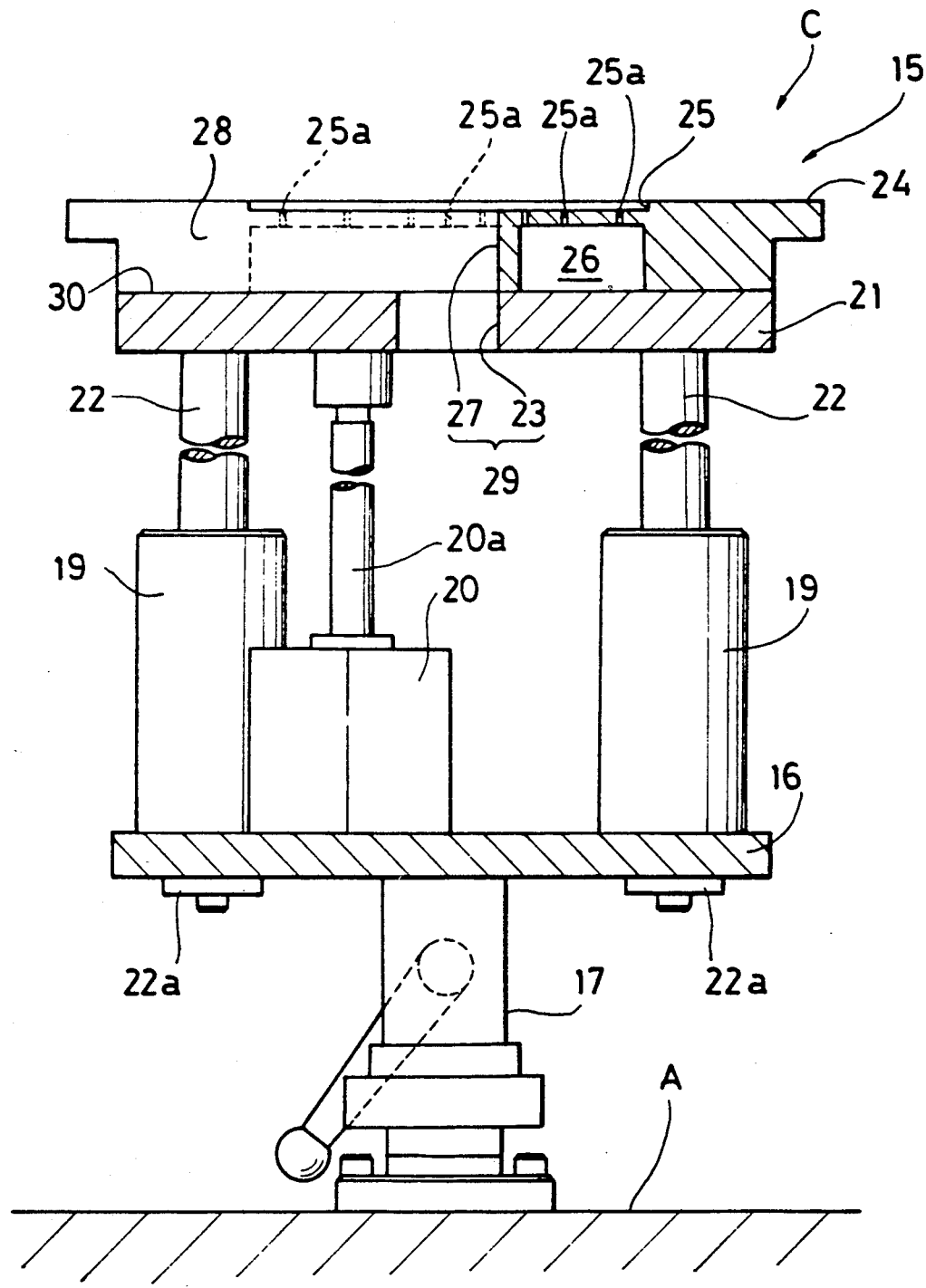
FIG. 7 is a view taken in the direction indicated by 7—7 arrows in FIG. 6.
Figure 8:
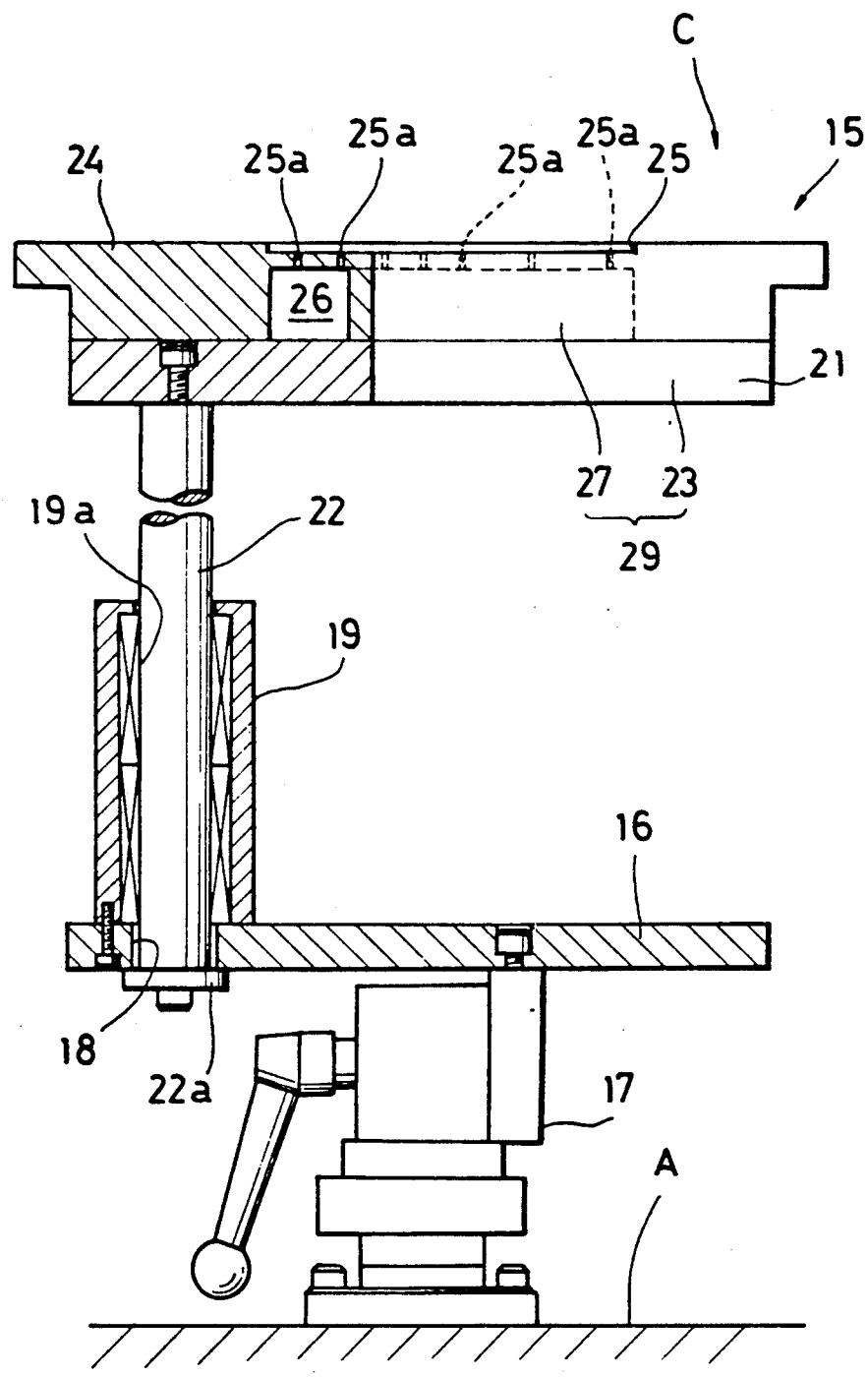
FIG. 8 is a view taken in the direction indicated by 8—8 arrows in FIG. 6.

The resin supplying section C will be described below with reference to FIGS. 6 to 8.

Reference numeral 16 denotes a substantially rectangular, plate-like lower plate of the fixed table 15. The lower plate 16 is supported on the bed A through a height adjusting mechanism 17. Through holes 18 are respectively formed in three of the four corner portions of the lower plate 16 together with bearings 19 extending therefrom. Hollows 19a of the bearings 19 and the through holes 18 are coaxially arranged.

Reference numeral 20 denotes an air cylinder fixed on the lower plate 16 and having a plunger 20a protruding upwards.

Reference numeral 21 denotes a rectangular upper plate having substantially the same size as that of the lower plate 16.

Guided bars 22 extend vertically downwards from three of the four corner portions of the upper plate 21. These guided bars 22 are slidably inserted in the hollows 19a of the bearings 19, respectively. Reference numeral 22a denotes a stop piece fixed to the lower end of each guided bar 22. These stop pieces 22a prevent upward removal of the guided bars 22 from the bearings 19.

The upper end of the plunger 20a of the air cylinder 20 is coupled to the upper plate 21, and the upper plate 21 is vertically moved upon driving of the air cylinder 20.

A slit 23 is formed in the upper plate 21 so as to extend from the center to one side. Note that the slit 23 is formed into an arcuated shape.

Reference numeral 24 denotes a backboard fixed to the upper surface of the upper plate 21. A shallow, circular recess is formed, as a disklike-plate setting section 25, in the upper surface of the backboard 24.

The backboard 24 has a certain thickness. A closed space is formed in the backboard 24. A large number of apertures 25a are formed in the disklike-plate setting section 25 so as to communicate with the closed space 26. The closed space 26 is coupled to an air suction mechanism (not shown) and is set at a negative pressure as needed.

Slits 27 and 28 are respectively formed in the backboard 24 so as to extend from the center to different sides. Slit 27 has an arcuated shape and is overlaid on the slit 23 of the upper plate 21. These two slits 23 and 27 constitute a curved slot 29. The other slit 28 extends straight in a direction substantially perpendicular to the slit 27. The slit 28 and the upper plate 21 serving as the bottom of the slit 28 constitute a bottomed passage 30.

Figure 9:
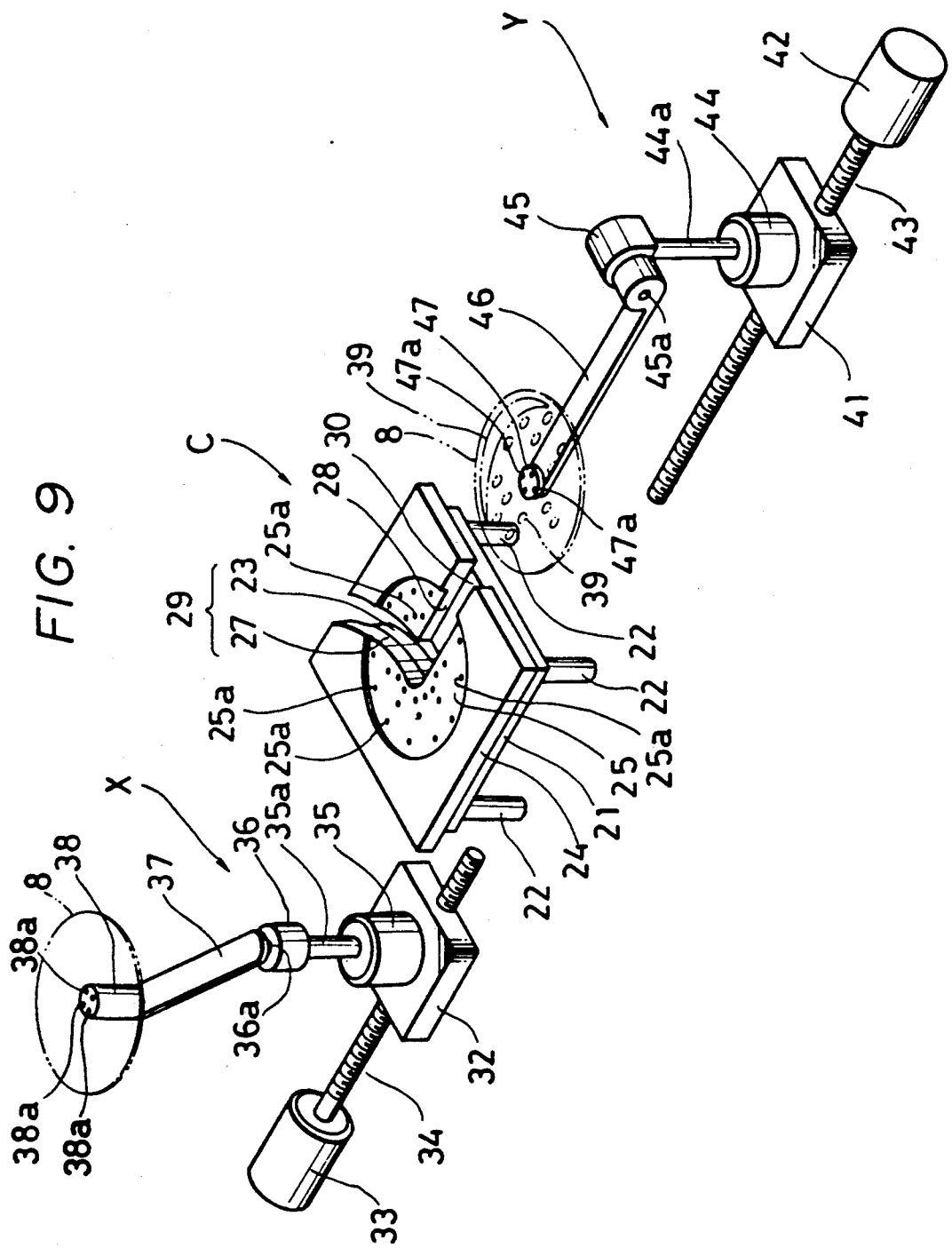
FIG. 9 is a schematic perspective view of first and second disklike-plate transport devices.

The first and second disklike-plate transport devices X and Y will be described below with reference to FIGS. 9 to 11.

The first disklike-plate transport device X supplies the disklike plate 8 from the disklike-plate supplying section B to the resin supplying section C.

Reference numeral 32 denotes a movable block with which a feed screw 34 rotated by a motor 33 is threadably engaged. When the feed screw 34 is rotated, the movable block 32 is moved along a direction in which the feed screw 34 extends.

Reference numeral 35 denotes an air cylinder fixed on the upper surface of the movable block 32. A plunger 35a of the air cylinder 35 is designed to be vertically moved.

Reference numeral 36 denotes a pneumatic motor fixed to the upper end of the plunger 35a of the air cylinder 35. A shaft 36a vertically extending from the pneumatic motor 36 is rotated by pneumatic control.

Reference numeral 37 denotes an arm fixed to the shaft 36a of the pneumatic motor 36. A suction head 38 is fixed to the pivot end portion of the arm 37. Suction ports 38a are formed on the upper surface of the suction head 38 so as to be arranged in a circle. Negative pressures are respectively generated in the suction ports 38a upon driving of an air suction mechanism (not shown).

The second disklike-plate transport device Y removes the disklike plate 8, to which an ultraviolet-set resin is supplied by the resin supplying section C, from the disklike-plate setting section 25 of the fixed table 15 and supplies it to the transfer section D.

Reference numeral 41 denotes a movable block with which a feed screw 43 rotated by a motor 42 is threadably engaged. When the feed screw 43 is rotated, the movable block 41 is moved along a direction in which the feed screw 43 extends.

Reference numeral 44 denotes an air cylinder fixed on the upper surface of the movable block 41. A plunger 44a of the air cylinder 44 is designed to be vertically moved.

Reference numeral 45 denotes a pneumatic motor fixed to the upper end of the plunger 44a. A shaft 45a horizontally extending from the pneumatic motor 45 is rotated by pneumatic control.

Reference numeral 46 denotes an arm fixed to the shaft 45a of the pneumatic motor 45. A suction head 47 is fixed on the pivot end portion of the arm 46. Suction ports 47a are formed in the suction head 47 arranged in a circle. Negative pressures are respectively generated in the suction ports 47a upon driving of an air suction mechanism (not shown).

Two types of transport operations will be sequentially described below with reference to FIGS. 9 to 13F. In one type, the disklike plate 8 is transported by the first disklike-plate transport device X from the disklike-plate supplying section B to the resin supplying section C. In the other type, the disklike plate 8 is transported by the second disklike-plate transport device Y from the resin supplying section C to the transfer section D.

When the movable block 32 of the first disklike-plate transport device X is moved to a predetermined position on the side of the disklike-plate supplying section B in the movable range of the movable block 32, the air cylinder 35 and the pneumatic motor 36 are driven to move the suction head 38 to a position under the case 7.

The suction head 38 is moved upwards to be inserted into the case 7 from below. The suction head 38 is then brought into contact, from below, with a central portion of a surface 8a of the lowermost disklike plate 8 in the case 7. Upon generation of negative pressures in the suction ports 38a of the suction head 38, the disklike plate 8 is drawn to the suction head 38.

When the movable block 32 is moved to the side of the backboard 24 having the disklike-plate setting section 25 of the resin supplying section C, the lowermost disklike plate 8 in the case 7 is transported by the suction head 38 from the disklike-plate supplying section B to the resin supply section C. At the same time, the suction head 38 is adjusted in height with respect to the backboard 24 upon driving of the air cylinder 35.

Figure 12A:
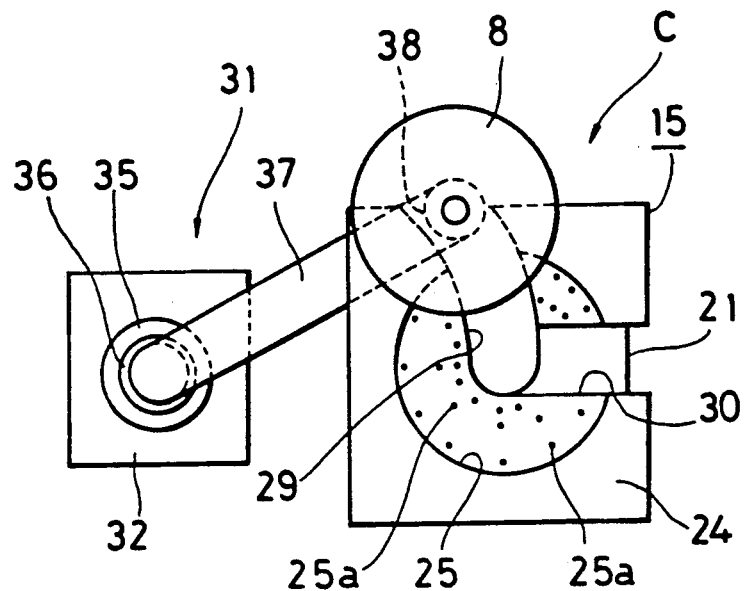
FIGS. 12A to 12F are plan views for explaining an operation of the first and second disklike-plate transport devices.
Figure 13A:
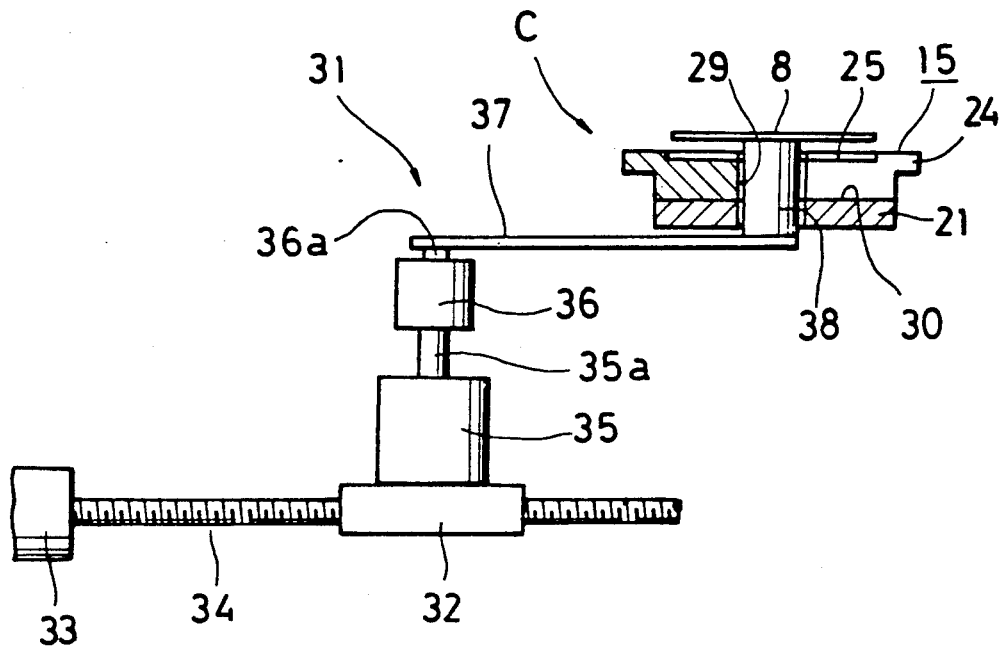
FIGS. 13A to 13F are sectional side views for explaining an operation of the first and second disklike-plate transport devices.

When the movable block 32 is moved to a predetermined position on the side of the resin supplying section C, the arm 37 is pivoted upon driving of the pneumatic motor 36 so as to cause the suction head 38 to reach the center of the disklike-plate setting section 25 through the arcuated curved slot with no bottom wall 29 of the backboard 24 and the upper plate 21, as shown in FIGS. 12A and 13A.

Figure 12B:
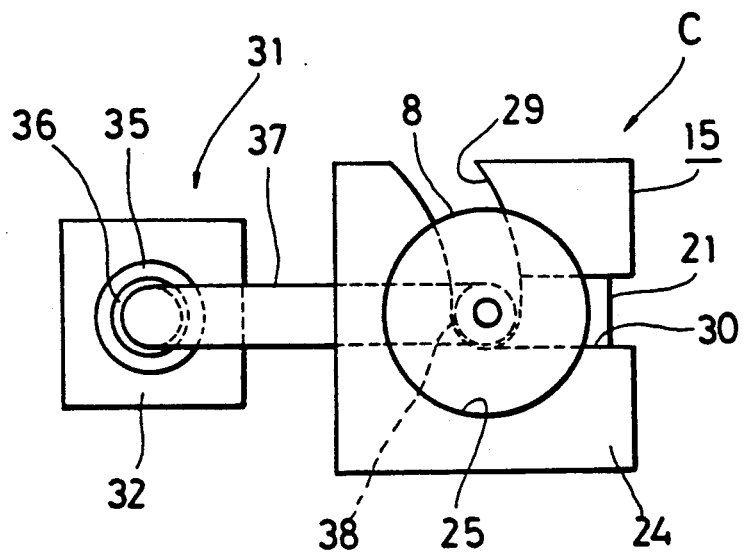
Figure 13B:
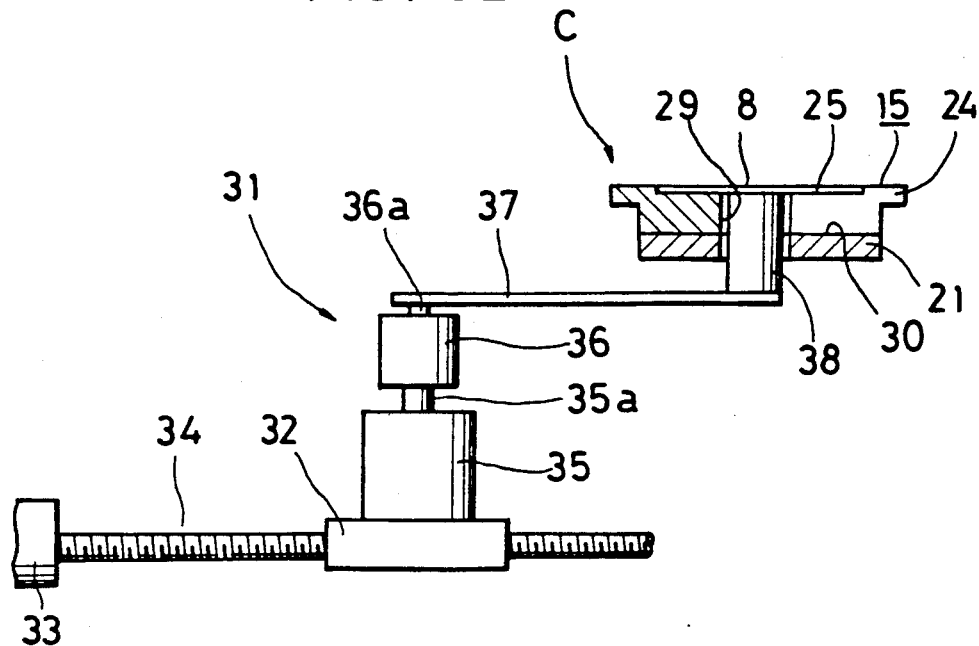

As shown in FIGS. 12B and 13B, the arm 37 is then slightly lowered upon driving of the air cylinder 35, and the disklike plate 8 is placed on the disklike-plate setting section 25. Thereafter, when negative pressures are generated in the apertures 25a of the disklike-plate setting section 25, the negative pressures which have been generated in the suction ports 38a of the suction head 38 are canceled. With this operation, the disklike plate 8 is firmly held by the disklike-plate setting section 25.

Figure 12C:
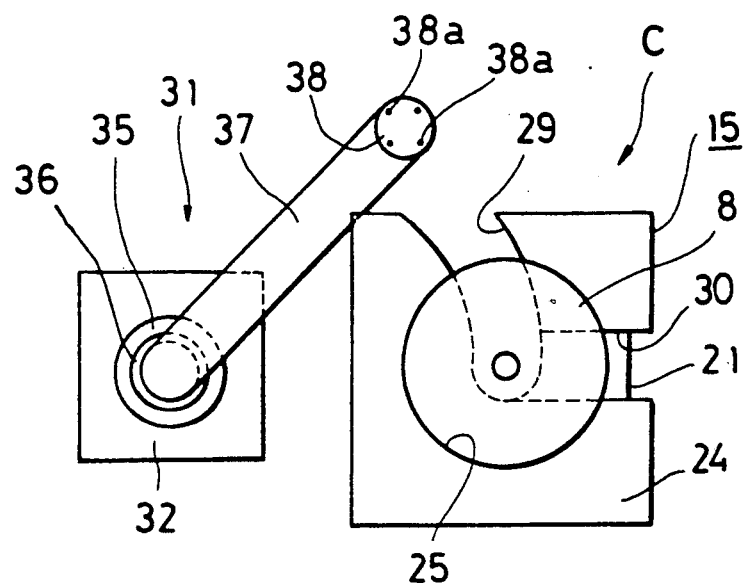

Subsequently, as shown in FIG. 12C, the arm 37 is pivoted to move the suction head 38 outside the backboard 24 through the curved slot 29.

Figure 12D:
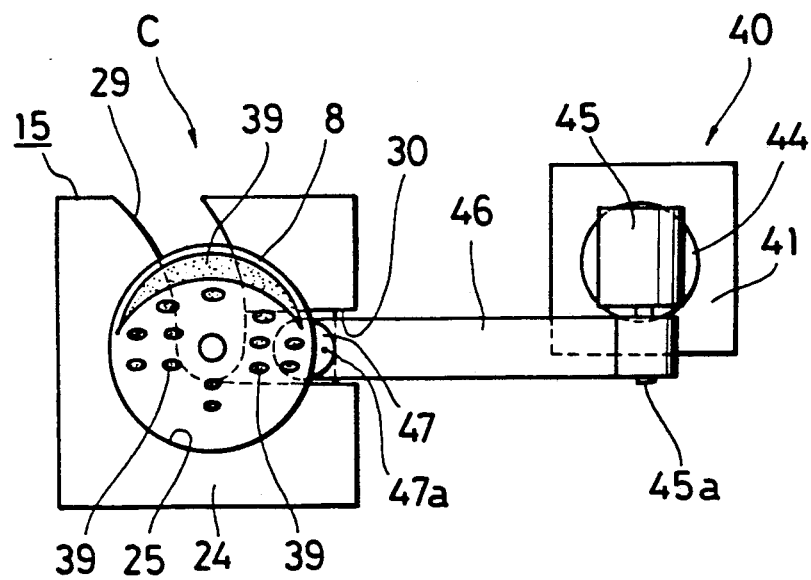
Figure 13C:
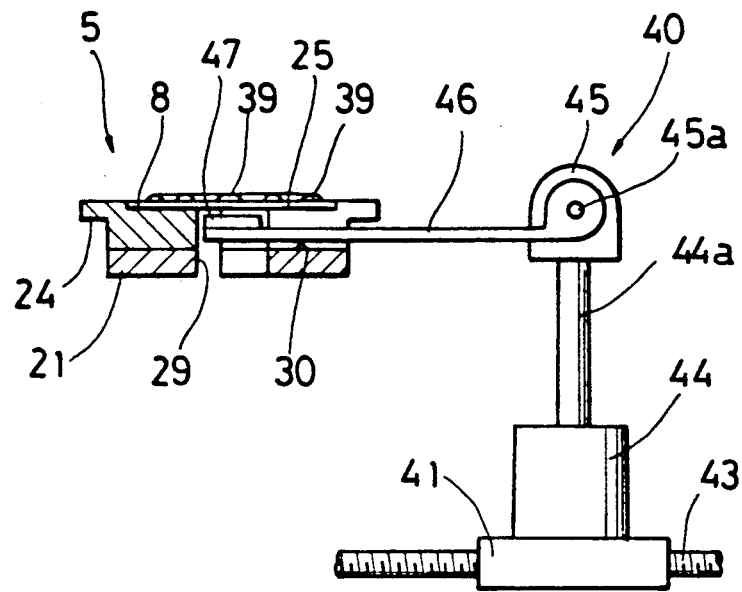

As shown in FIGS. 12D and 13C, the ultraviolet-set resin 39 is supplied to an upper surface 8b of the disklike plate 8. More specifically, while the disklike plate 8 is held by the disklike-plate setting section 25, an ultraviolet-set resin supplying device (not shown) is lowered from a position above the disklike plate 8 to a position where a screen of the resin supplying device is in tight contact with the disklike plate 8.

A large number of holes are formed in the screen. When a squeegee of the resin supplying device is moved on the screen, an ultraviolet-set resin is supplied to positions on the disklike plate 8 corresponding to the holes of the screen.

Figure 10:
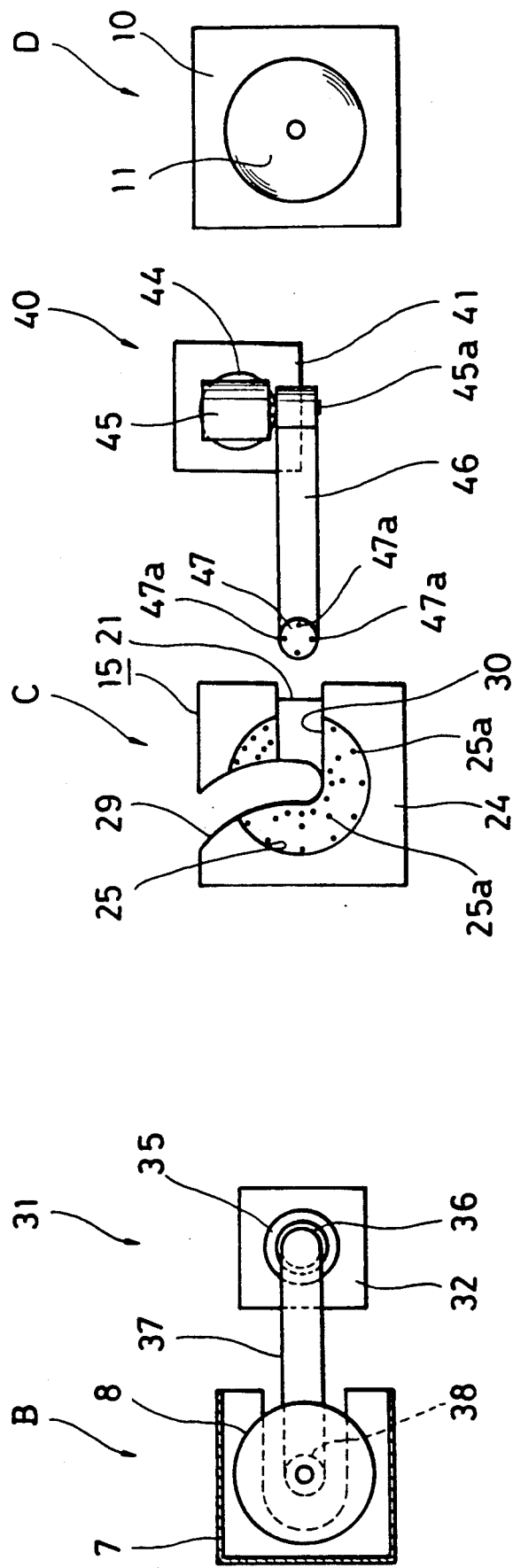
FIG. 10 is a plan view of the first and second disklike-plate transport devices.
Figure 11:
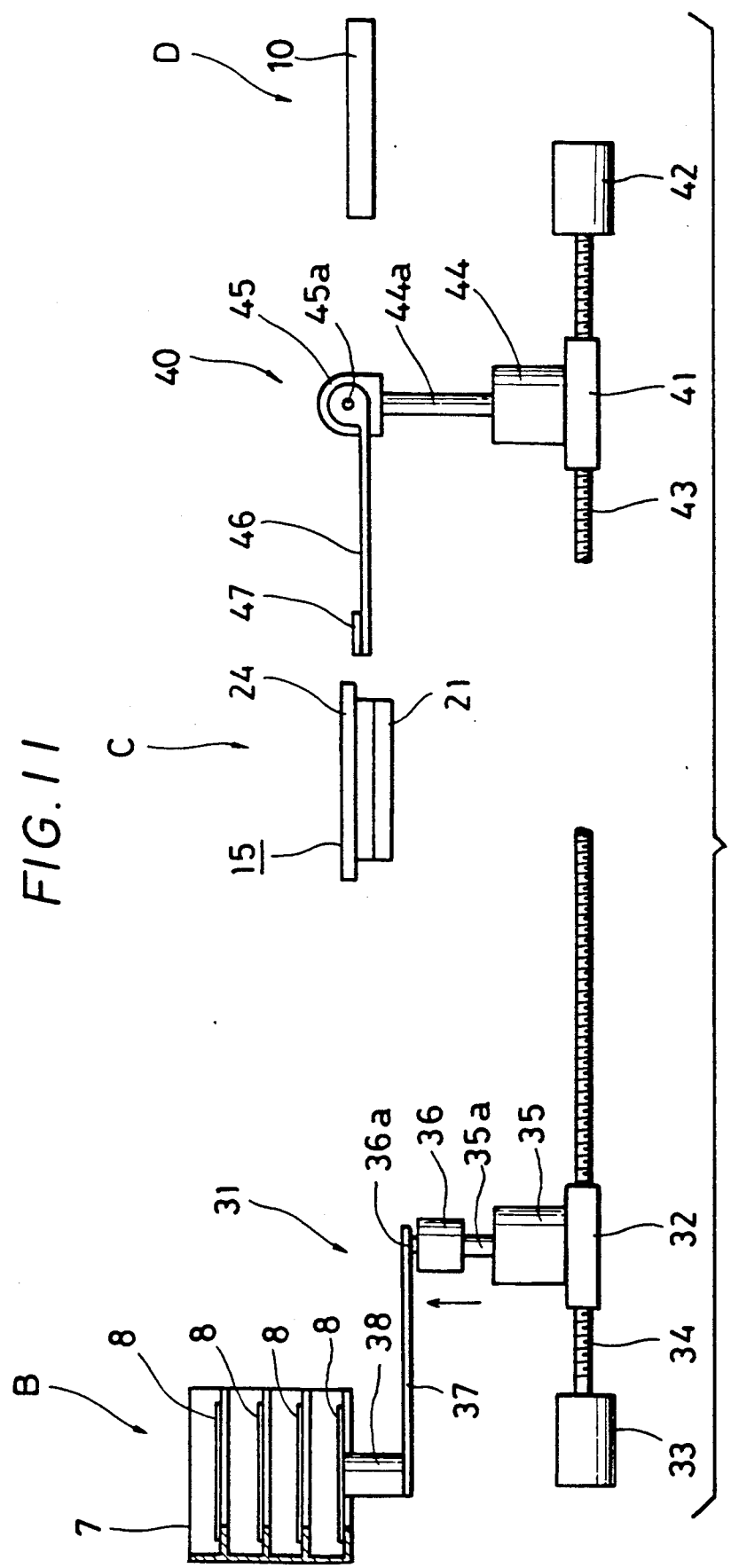
FIG. 11 is a side view of the first and second disklike-plate transport devices.

When the ultraviolet-set resin 39 is supplied to the upper surface 8b of the disklike plate 8, the movable block 41 of the second disklike-plate transport device Y is moved to the side of the backboard 24 of the resin supplying section C, as shown in FIGS. 10 and 11. As a result, the suction head 47 is moved to a position corresponding to the center of the disklike-plate setting section 25 through the curved slot 30 of the backboard 24, as shown in FIGS. 12D and 13C. In this case, the suction head 47 is held at a certain height in advance upon the driving of the air cylinder 44 so as not to be brought into contact with the disklike plate 8.

Figure 13D:
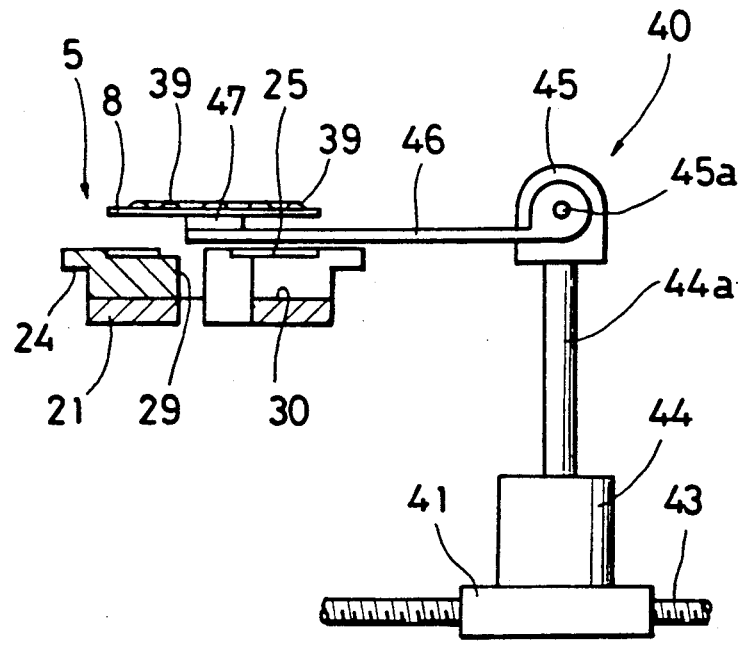

When the suction head 47 reaches the position corresponding to the center of the disklike-plate setting section 25, negative pressures are generated in the suction ports 47a. At the same time, the arm 46 is slightly moved upwards upon the driving of the air cylinder 44, as shown in FIG. 13D. During this upwards movement, the suction head 47 is brought into contact with the central portion of the lower surface 8a of the disklike plate 8 and draws it. At the same time, the negative pressures in the apertures 25a of the disklike-plate setting section 25 are canceled, and the disklike plate 8 is caused to slightly float from the disklike-plate setting section 25.

Figure 12E:
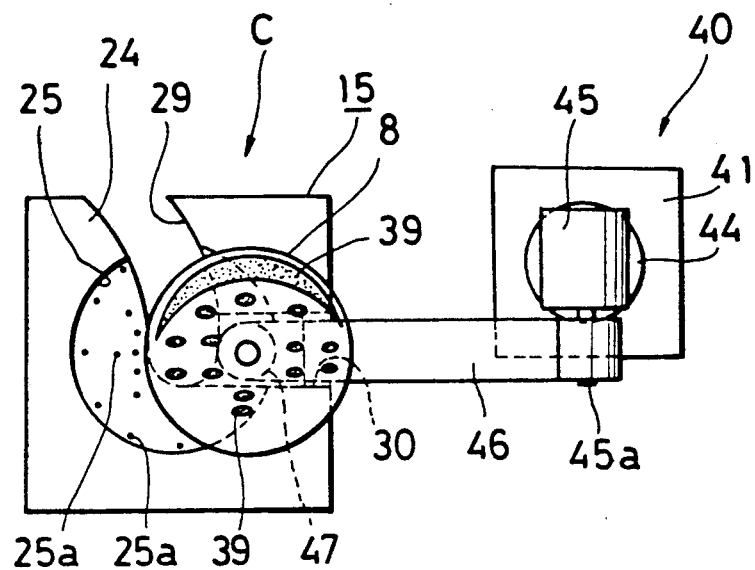
Figure 13E:
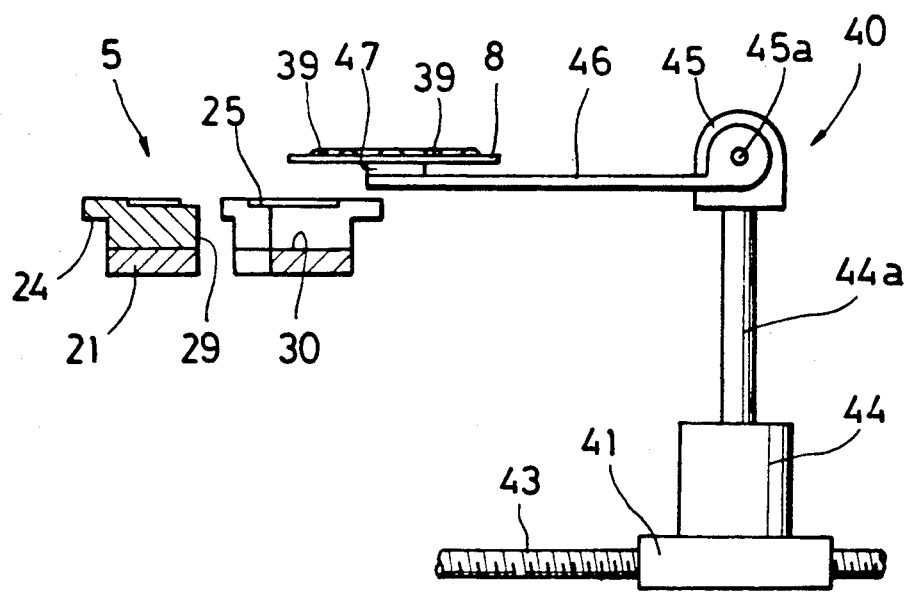

When the movable block 41 is moved to the transfer section D side as shown in FIGS. 12E and 13E, the disklike plate 8 to which the ultraviolet-set resin 39 is supplied is transported from the fixed table 15.

Figure 12F:
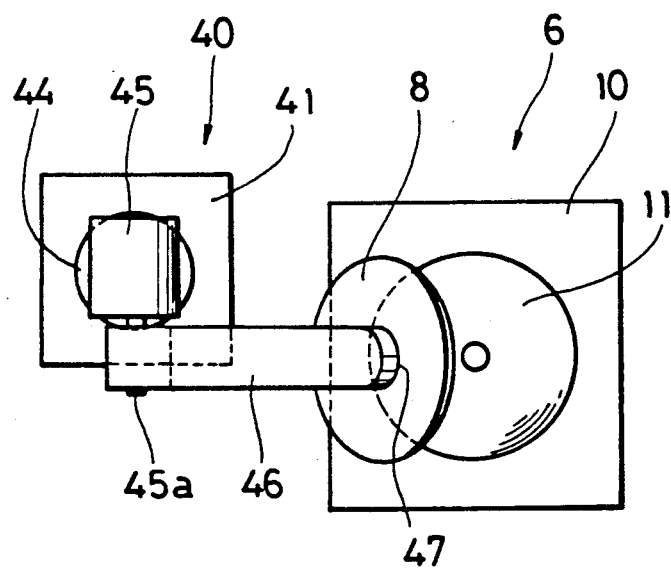
Figure 13F:
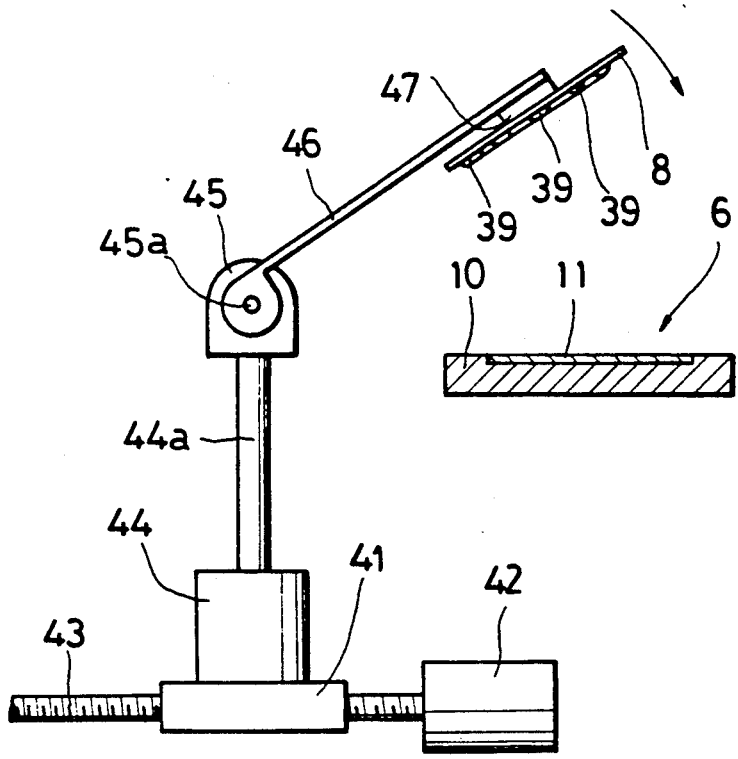
Figure 14:
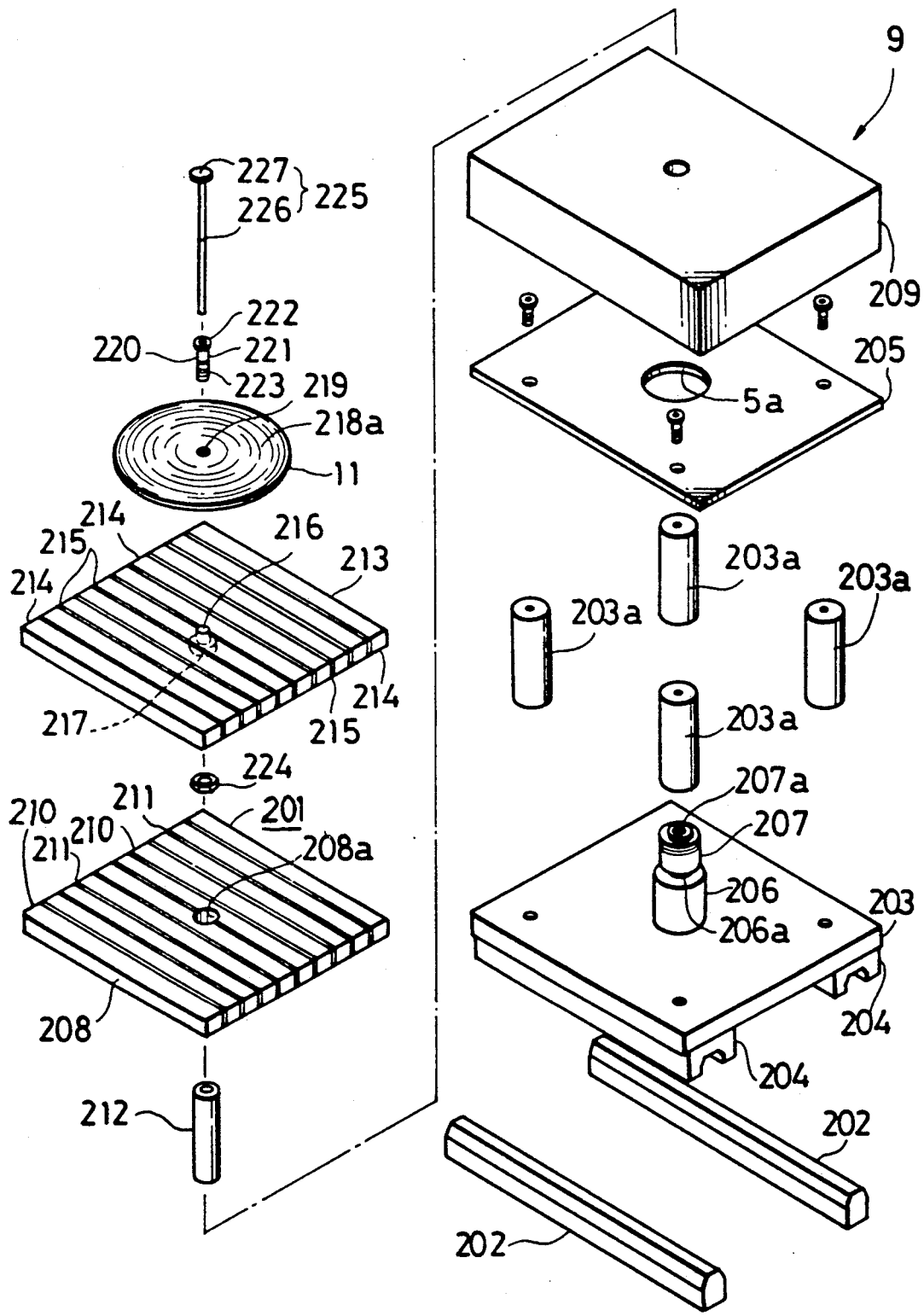
FIG. 14 is an exploded perspective view of a transfer section.
Figure 15:
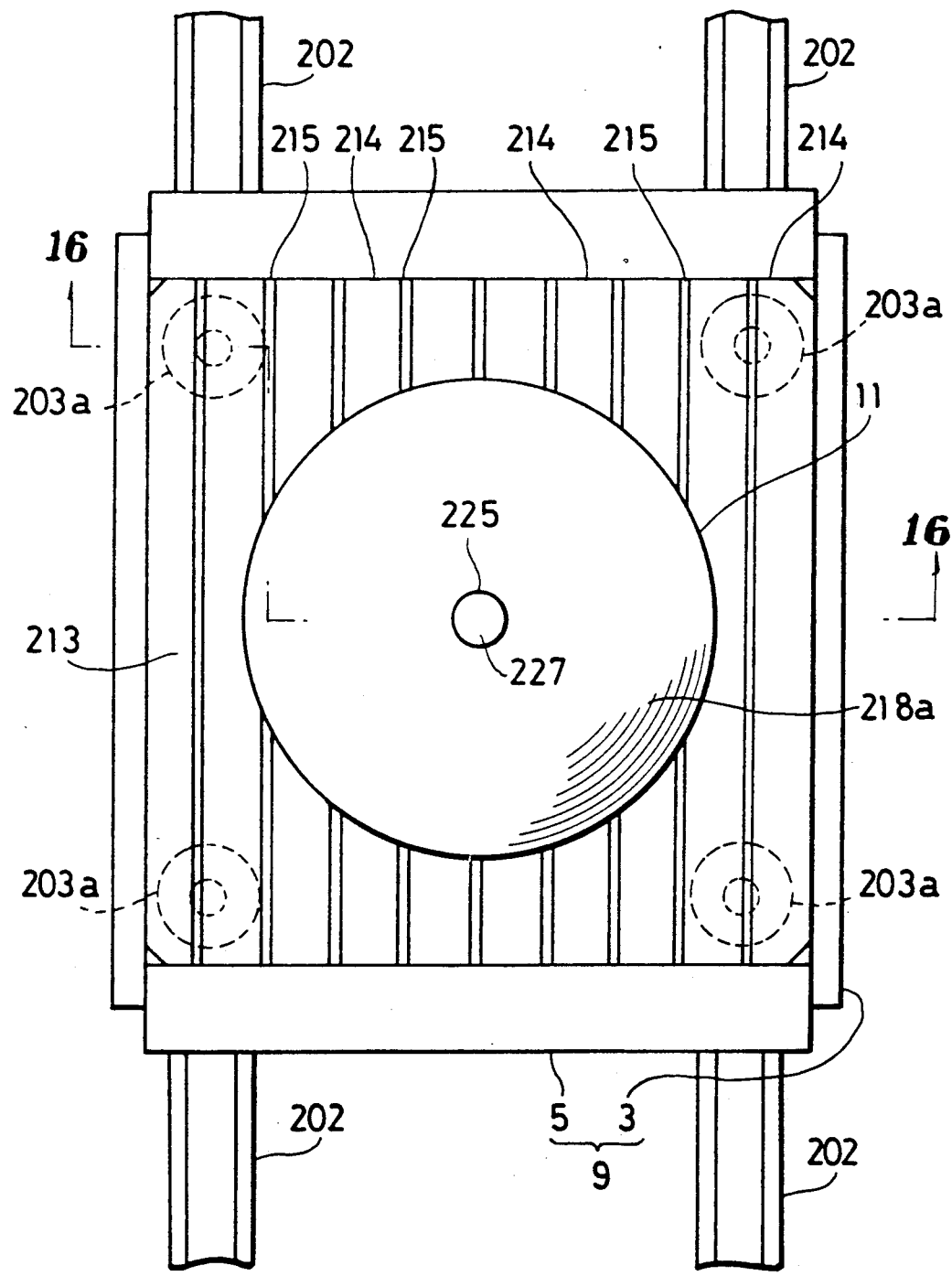
FIG. 15 is a plan view of the transfer section.

When the movable block 41 is moved to a position near the transfer section D as shown in FIGS. 12F and 13F, the pneumatic motor 45 is driven to pivot the arm 46 through 180°. As a result, the disklike plate 8 is reversed. That is, the upper surface 8b to which the ultraviolet-set resin 39 is supplied face down.

Subsequently, the arm 46 is lowered upon driving of the air cylinder 44, and the disklike plate 8 is overlaid on the stamper 11 of the transfer section D. At this time, the negative pressures in the suction ports 47a of the suction head 47 are canceled, and the suction on the disklike plate 8 which is exerted by the suction head 47 is canceled. The arm 46 is then slightly raised, and the suction head 47 is moved above the disklike plate 8. The movable block 41 is moved toward the resin supplying section C.

The transfer section D will be described below with reference to FIGS. 14 to 21.

The movable table 9 of the transfer section D is guided by rails 202 which are arranged on the bed A so as to be substantially perpendicular to the direction in which the disklike plate 8 is transported by the second disklike-plate transport device Y.

Reference numeral 203 denotes a lower plate of the movable table 9. Sliding blocks 204 are fixed to the lower surface of the lower plate 203. The sliding blocks 204 are slidably engaged with the rails 202, respectively.

Reference numeral 205 denotes an upper plate of the movable table 9, which is fixed to the lower plate 203 by legs 203a formed upright on the four corners of the lower plate 203.

Reference numeral 206 denotes an air cylinder fixed to the central portion of the upper surface of the lower plate 203. A seizing device 207 is fixed to the upper end of a plunger 206a, which is vertically moved by air cylinder 206. A known device is used as the seizing device 207. The seizing device 207 is designed such that when a bar-like member is inserted into a hole 207a formed in its upper end, the member can be moved in the inserting direction but cannot be moved in the pulling direction. The member inserted in the hole 207a can be pulled out by depressing a releasing mechanism (not shown). A hole 205a is formed in the central portion of the upper plate 205. The hole 207a of the seizing device 207 is open to the above through the hole 205a.

Reference numeral 208 denotes a flat, rectangular electromagnet plate which is fixed to the upper plate 205 of the movable table 9 through a supporting plate 209. The electromagnet plate 208 constitutes an attaching base 10 together with a top plate 213 (to be described later). The electromagnet plate 208 has a structure in which ferromagnetic materials 210 and spacers 211 consisting of a low-permeability material and extending in the same direction are alternately arranged and integrated. When a field line generating section (not shown) attached to the electromagnet plate 208 is energized, the electromagnet plate 208 generates a strong electromagnetic attraction.

A hole 208a is formed in the central portion of the electromagnet plate 208. A synthetic resin sleeve 212 is fixed in the hole 208a by forcible insertion. The lower end of the sleeve 212 opposes the hole 207a of the seizing device 207 from above.

Similar to the electromagnet plate 208, the top plate 213 is designed such that ferromagnetic materials 214 and spacers 215 consisting of a low-permeability material extending in the same direction are alternately arranged and integrated.

Each ferromagnetic material 210 of the electromagnet plate 208 has the same width as that of each ferromagnetic material 214 of the top plate 213. In addition, each spacer 211 of the electromagnet plate 208 has the same width as that of each spacer 215 of the top plate 213. Therefore, the electromagnet plate 208 and the top plate 213 can be stacked on top of each other in such a manner that the respective ferromagnetic materials 210 and 214 and the respective spacers 211 and 215 perfectly coincide with each other.

Figure 16:
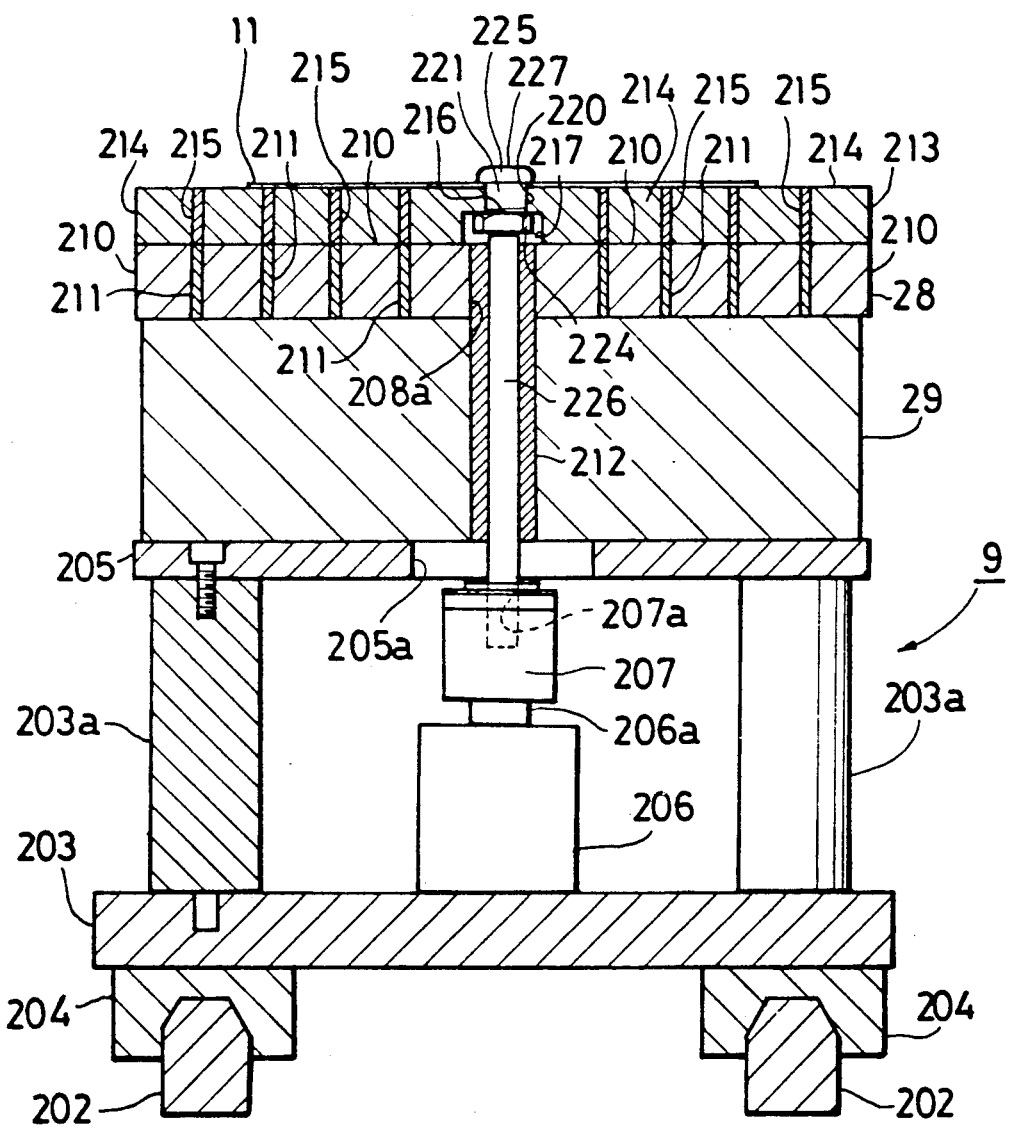
FIG. 16 is a view taken in the direction indicated by 16—16 arrows in FIG. 15.

A positioning hole 216 is formed in the central portion of the top plate 213. In addition, a recess 217 is formed in the lower surface of the top plate 213 surrounding the positioning hole 216. Therefore, the lower end of the positioning hole 216 opens into in the recess 217 (FIG. 16).

The stamper 11 is composed of nickel or the like. Small recesses (not shown) or signal pits are formed in an upper side 218a of the stamper 11. The lower side 218b has a flat surface.

A central hole 219 is formed in the center of the stamper 11 so as to have the same diameter as that of the positioning hole 216 of the top plate 213.

Reference numeral 220 denotes a fixing sleeve which is designed such that a cylindrical portion 221 and a flange portion 222 are integrally formed. The cylindrical portion 221 has substantially the same outer diameter as the diameter of the positioning hole 216 of the top plate 213 or of the central hole 219 of the stamper 11. The flange portion 222 slightly protrudes from the upper end of the cylindrical portion 221. A threaded groove is formed on the outer surface of a lower portion of the cylindrical portion 221 so as to constitute a threaded portion 223.

Reference numeral 224 denotes a nut to be threadably engaged with the threaded portion 223 of the fixing sleeve 220.

The stamper 11 is mounted on the top plate 213 in the following manner.

Figure 17:
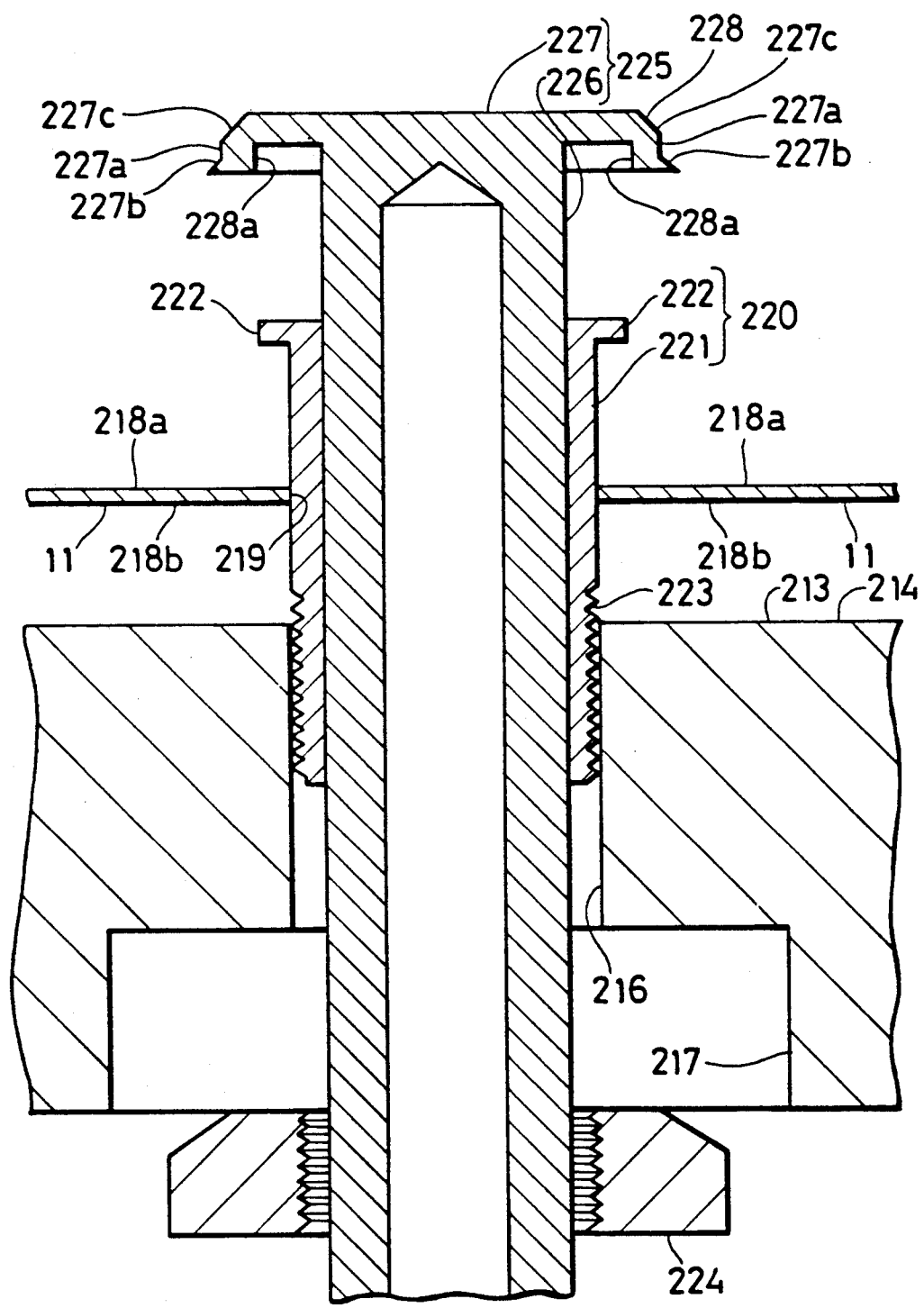
FIGS. 17 and 18 are sectional views showing a stamper mounting structure.

As shown in FIG. 17, the stamper 11 is overlaid on the top plate 213 such that the lower side 218b is brought into contact with the upper surface of the top plate 213, and the central hole 219 of the stamper 11 is matched with the positioning hole 216 of the top plate 213.

Figure 18:
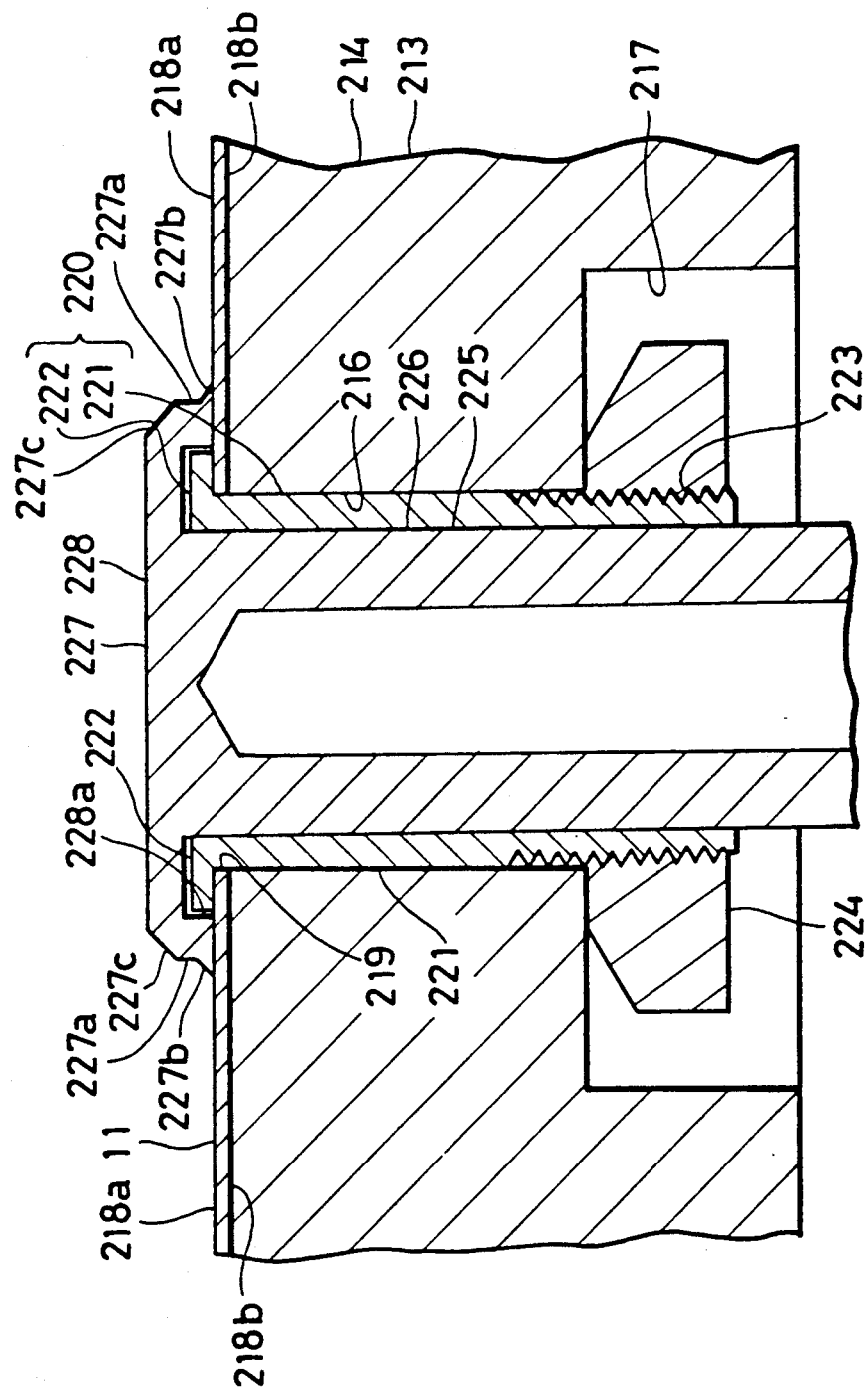
Figure 19B:
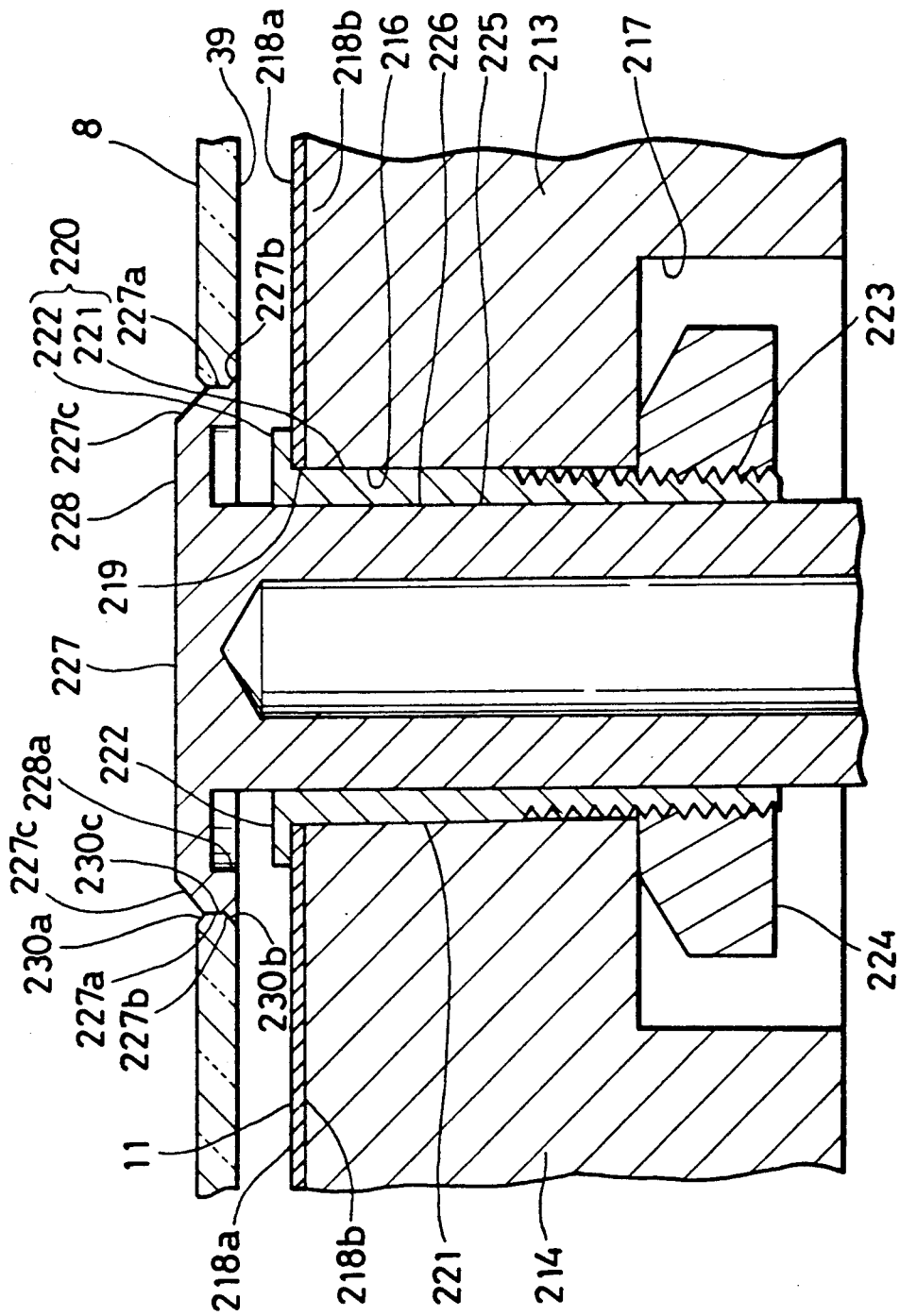
Figure 20:
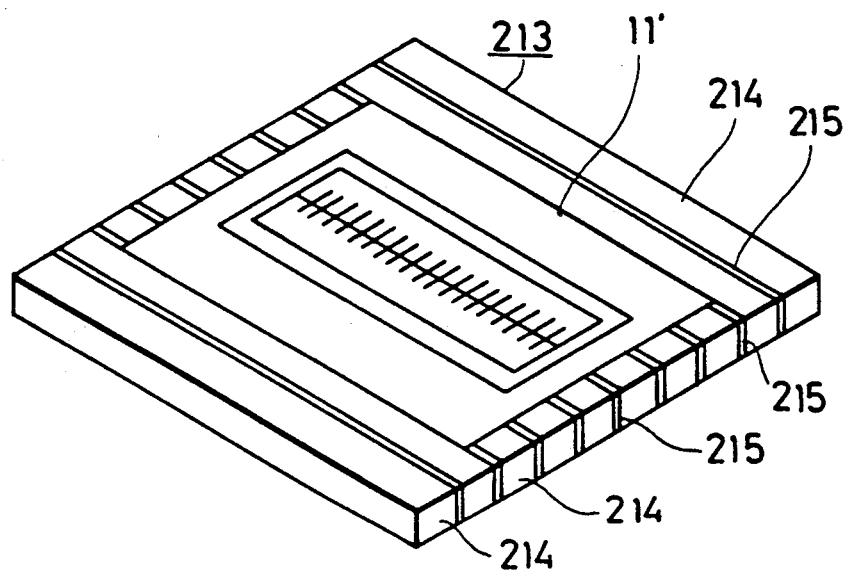
FIG. 20 is a perspective view showing a modification of the stamper.

Subsequently, as shown in FIG. 18, the cylindrical portion 221 of the fixing sleeve 220 is inserted into the central hole 219 of the stamper 11 and the positioning hole 216 of the top plate 213 in this order, and the nut 224 is threadably engaged with the threaded portion 223 of the fixing sleeve 220 which protrudes into the recess 217 of the top plate 213. With this operation, the opening edge of the central hole 219 of the stamper 11 is clamped between the flange portion 222 of the fixing sleeve 220 and the upper surface of the top plate 213.

Reference numeral 225 denotes a pin constituted by a cylindrical portion 226 and a disk-like head portion 227 fixed to the upper end of the cylindrical portion 226. A periphery 228 of the head portion 227 protrudes outwards in the form of a flange. An annular groove 228a is formed in the lower surface of the periphery 228 in such a manner that the inner end of the annular groove 228a is defined by the outer surface of the cylindrical portion 226 (FIG. 18). The annular groove 228a has a size which allows the flange portion 222 of the fixing sleeve 220 to be fitted therein with a slight margin.

The outer surface of the head portion 227 is constituted by a positioning surface 227a, an engaging surface 227b and a guiding surface 277c. The positioning surface 227a is located at an intermediate position and constitutes an annular surface parallel to the axis of the cylindrical portion 226. The engaging surface 227b which is continuous with the lower end of the positioning surface 227a and is increasingly displaced outwards toward the lower end so as to constitute an inclined surface. The guiding surface 227c which is increasingly displaced inwards toward the upper end so as to constitute an inclined surface.

As shown in FIG. 16, the top plate 213, on which the stamper 11 is held in the above-described manner, is mounted on the upper surface of the electromagnet plate 208.

The cylindrical portion 226 of the pin 225 is inserted into the fixing sleeve 220 and the sleeve 212 in this order from the above. The lower end portion of the cylindrical portion 226 is then inserted into the hole 207a of the seizing device 207.

When the plunger 206a is moved downwards upon driving of the air cylinder 206, the pin 225 is pulled by the plunger 206a and is lowered. As a result, the upper end flange portion 222 of the fixing sleeve 220 is covered by the disklike head portion 227 of the pin 225.

When the electromagnet plate 208 is energized, the top plate 213 is magnetically attracted to the electromagnet plate 208. At the same time, the stamper 11 is magnetically attracted to the top plate 213, and the lower side 218b of the stamper 11 exhibits a high flatness conforming with the flat upper surface of the top plate 213.

When the top plate 213 is to be separated from a slide table 201, the electromagnet plate 218 is deenergized to release the lower end portion of the pin 225 from the seizing device 207, and the pin 225 is pulled out from the sleeve 212 and the fixing sleeve 220. Thereafter, the top plate 213 can be moved from the electromagnet plate 208.

A stamper is basically designed to be held to the top plate 213 by magnetic attraction. Therefore, a strip type stamper 11' shown in FIG. 20, for example, may be used in addition to a circular stamper having a central hole.

Figure 21:
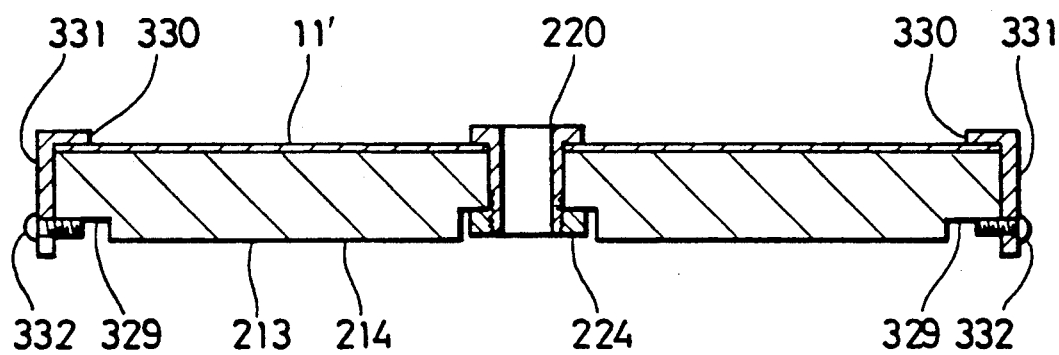
FIG. 21 is a sectional view of the modification.

In the above-described embodiment, as a means for temporarily pressing the stamper 11, the central portion of the stamper 11 is pressed by the fixing sleeve 220. As shown in FIG. 21, however, a stepped portion 329 may be formed in the periphery of the lower surface of the top plate 213, and a fixing device 331 having a pressing edge 330, which may be formed at its upper end so as to extend inward and is fixed to the top plate 213 with screws 332, thus pressing the periphery of the stamper 11 with the pressing edge 330. This arrangement can prevent the periphery of the stamper 11 from floating away from the top plate 213 during maintenance or transportation, and hence can prevent foreign substances from entering between the periphery of the stamper 11 and the top plate 213 or damaging to the periphery of the stamper 11. In addition, with this arrangement, floating of the stamper 11 away from the top plate 213 during separation of a disklike plate can be more reliably prevented in comparison with the case of pressing only the central portion of the stamper 11.

Figure 22:
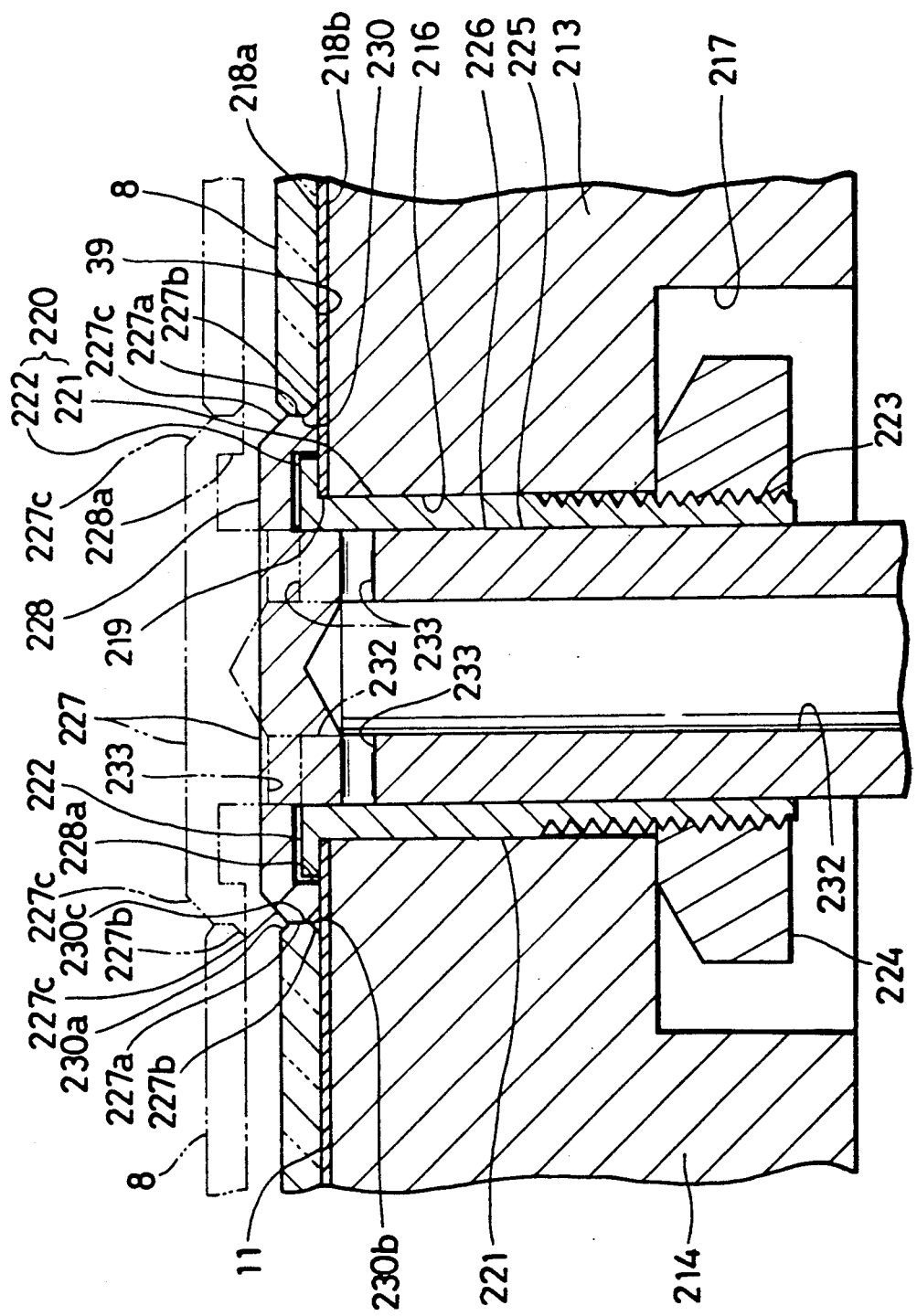
FIG. 22 is an enlarged sectional view showing the main part of a modification of the stamper mounting structure.

FIG. 22 shows a modification of the pin 225.

A through hole 233 is formed at a position slightly lower than the disklike head portion 227 of the pin 225 so as to cause a central hole 232 to communicate with the outer surface.

When the disklike plate 8 is to be separated from the stamper 11, the engagement between the pin 225 and the air cylinder 206 is released, and air, e.g., an $N_2$ gas is forcibly supplied into the central hole 232 of the pin 225. Upon this forcible supply of the $N_2$ gas, the pin 225 is moved from the upper end of the fixing sleeve 220 to an upper position (see alternately long and two short dashed lines in FIG. 22).

The pin 225 can be raised by air in this manner.

A modification of the second disklike-plate transport device Y, a transfer method for the transfer section D, and transportation of a disklike plate 8 from the transfer section D will be described below with reference to FIGS. 5, 16, 19A, 19B and 23 to 26C.

Figure 26A:
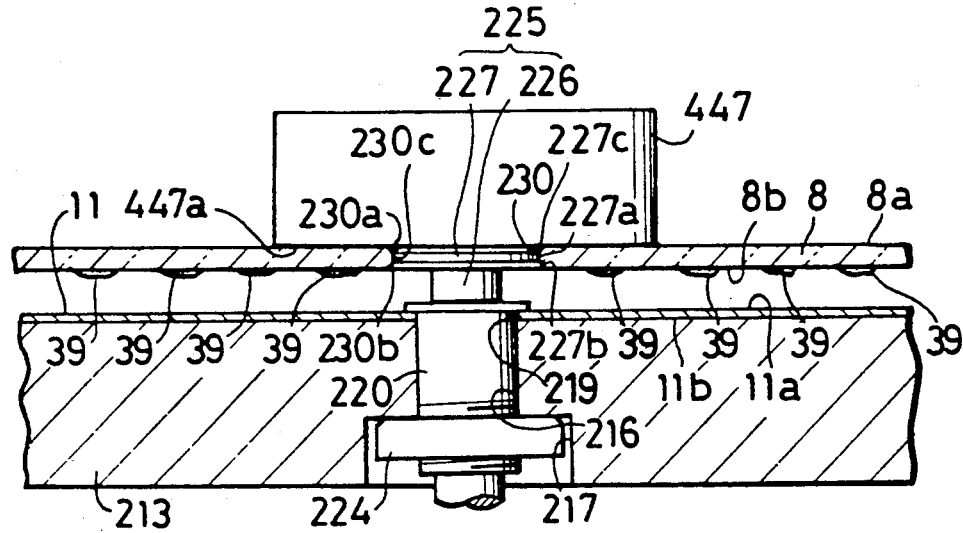
FIGS. 26A to 26C are enlarged sectional view, showing the main part, for explaining a transfer operation in detail.

As shown in FIG. 26A, a disklike plate 8 is constituted by a transparent glass plate and a transparent synthetic resin member or the like in the form of a disk. A central hole 230 is formed in the center of the disklike plate 8.

The upper and lower portions of the inner wall of the center hole 230 of the disklike plate 8 are chamfered to form tapered surfaces 230a and 230b. A portion between these two tapered surfaces 230a and 230b constitutes a positioning surface 230c parallel to the rotational axis of the disklike plate 8.

Figure 23:
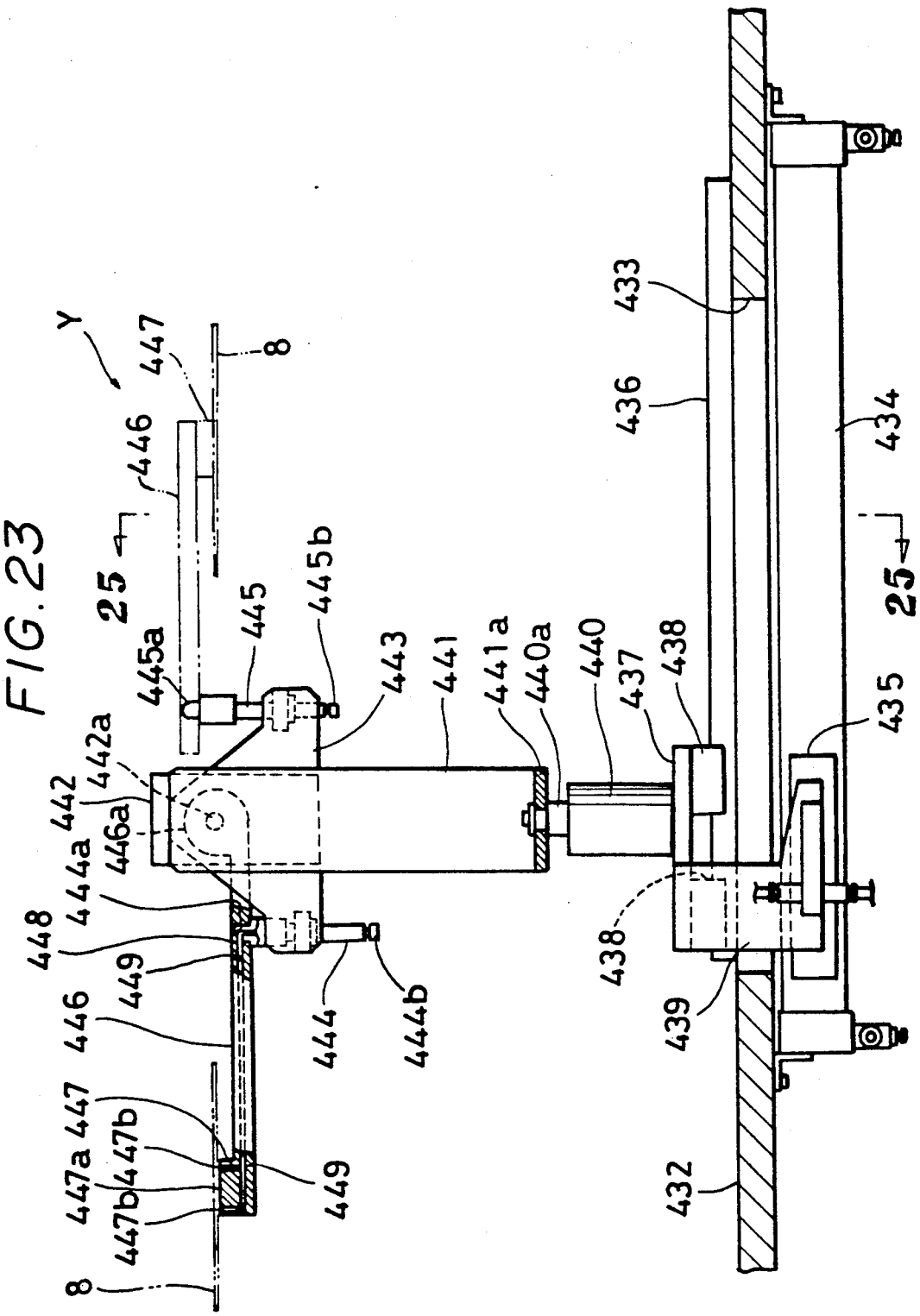
FIG. 23 is a sectional side view showing a modification of the second disklike-plate transport device.
Figure 24:
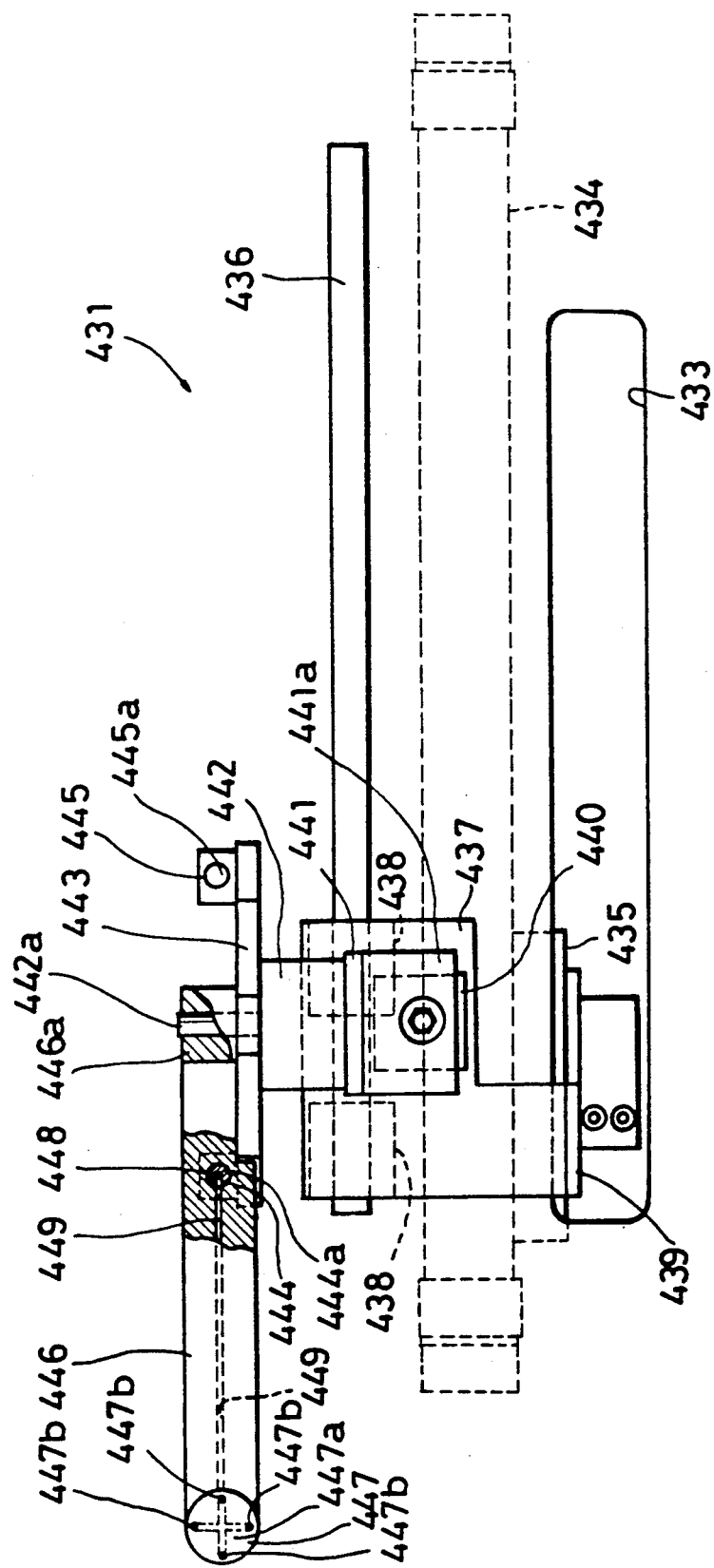
FIG. 24 is a partially cutaway plan view of the modification shown in FIG. 23.
Figure 25:
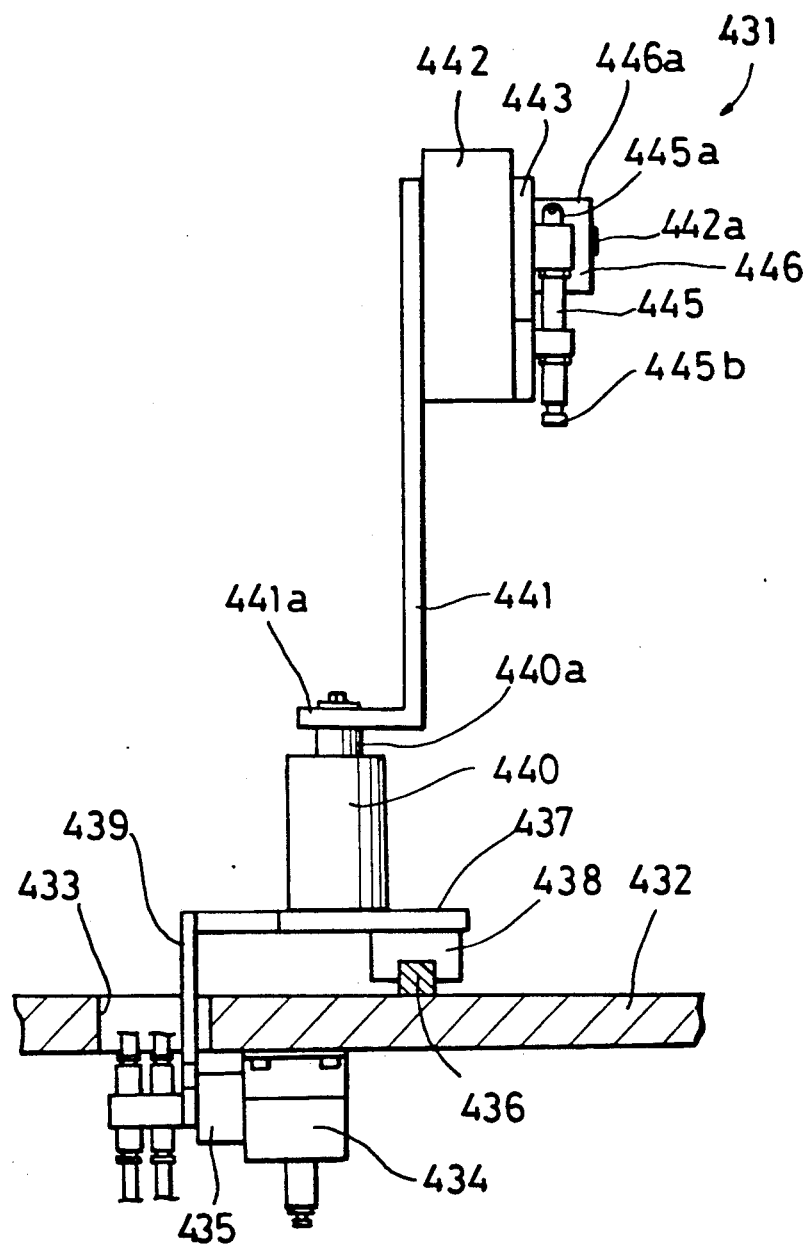
FIG. 25 is a view taken in the direction indicated by 25—25 arrows in FIG. 23.

As shown in FIGS. 23 to 25, reference numeral 432 denotes a top plate of the bed on which the rails 202 and the like shown in FIG. 16 are fixed. A slot 433 is formed in the top plate 432.

Reference numeral 434 denotes a feed mechanism of an air cylinder type which is arranged on the lower surface of the top plate 432 such that its longitudinal portion extends along the edge of one side the slot 433. A movable piece 435 which is moved along the longitudinal direction of the feed mechanism 434 is arranged on a side opposite the slot 433.

Reference numeral 436 denotes a rail which is separated from the slot 433 on the upper surface of the top plate 432 and extends in a direction perpendicular to the rails 202.

Reference numeral 437 denotes a substantially plate-like movable block. A sliding block 438 which is fixed to the lower surface of the movable block 437 at a position located near one side thereof is slidably engaged with the rail 436. The sliding block 438 is coupled to the movable piece 435 of the feed mechanism 434 through a connecting piece 439 which is inserted in the slot 433 from the other side of the lower surface of the movable block 437. With this arrangement, when the movable piece 435 is moved along the slot 433 by a pneumatic control, the movable block 437 is also moved along the slot 433 and guided by the rail 436.

Reference numeral 440 denotes an air cylinder fixed to the upper surface of the movable block 437. A plunger 440a of the air cylinder 440, which is designed to be vertically moved, protrudes from the upper end of the movable block 437.

Reference numeral 441 denotes a plate-like vertical rod having a lower end 441a fixed to the upper end of the plunger 440a of the air cylinder 440.

Reference numeral 442 denotes a pneumatic motor fixed to the upper end of the vertical rod 441. A shaft 442a horizontally protruding from the pneumatic motor 442 is rotated by pneumatic control.

Reference numeral 443 denotes a supporting plate fixed to the casing of the pneumatic motor 442. Connectors 444 and 445 are respectively fixed to both ends of the supporting plate 443, which oppose each other through the shaft 442a of the pneumatic motor 442 and are separated from the shaft 442a by the same distance.

The connectors 444 and 445 respectively have couplings 444a and 445a at their upper ends. Openings 444b and 445b located at the lower ends of the connectors 444 and 445 are connected to an air suction mechanism (not shown) through connecting pipes (not shown).

Reference numeral 446 denotes an arm having a proximal end 446a fixed to the shaft 442a of the pneumatic motor 442. Therefore, when the pneumatic motor 442 is driven by pneumatic control, the arm 446 is pivoted.

Reference numeral 447 denotes a suction head arranged on the pivot end portion of the arm 446. A plurality of suction ports 447a are formed in the free end surface 447a (suction surface) of the arm 446, so as to be arranged in one circle.

Reference numeral 448 denotes an insertion hole which is vertically formed in the arm 446 at a position near its proximal end. Reference numeral 449 denotes an air passage formed in the arm 446. One end of the air passage communicates with the suction ports 447b of the suction head 447, and the other end is open to a side wall of a central portion of the insertion hole 448 in the vertical direction. When the couplings 444a and 445a of the connectors 444 and 445 are fitted in the insertion hole 448, the insertion hole 448 is sealed from the outside. At the same time, the other end of the air passage 449 is connected to an air suction mechanism (not shown) through the connectors 444 and 445. Therefore, negative pressures are generated in the suction ports 447b of the suction head 447 upon driving of the air suction mechanism.

When the arm 446 is pivoted to a position (to be referred to as a first position hereinafter) where the insertion hole 448 is fitted on the coupling 444a of one connector 444 suction surface 447a of the suction head 447 faces up. When the arm 446 is pivoted to a position (to be referred to as a second position hereinafter) where the insertion hole 448 is fitted on the coupling 445a of the other connector 445, the suction surface 447a of the suction head 447 faces down.

An operation based on the above-described arrangement will be described below.

As shown in FIG. 26A, in the resin supplying section C shown in FIG. 5, the liquid ultraviolet-set resin 39 is supplied to the upper surface 8b of the disklike plate 8 in the form of a desired pattern by a technique of screen printing.

As shown in FIG. 23, when the movable block 437 is moved toward the resin supplying section C (not shown) while the arm 446 is set at the first position indicated by solid lines, the suction surface 447a of the suction head 447 is brought into contact with the central portion of the lower surface 8a of the disklike plate 8 having the upper surface 8b facing up, to which the ultraviolet-set resin 39 is supplied. Negative pressures are generated in the suction ports 447b, and the opening edge of the central hole 230 of the lower surface 8a of the disklike plate 8 is drawn to the suction head 447.

The movable block 437 is then moved toward the movable table 9 of the transfer section D. Meanwhile, the pneumatic motor 442 is driven to pivot the arm 446 to the second position indicated by alternate long and two short dashed lines. As a result, the upper surface 8b of the disklike plate 8, to which the ultraviolet-set resin 39 is supplied faces down.

Subsequently, as shown in FIG. 26A and FIG. 16, the air cylinder 206 is driven to slightly raise the plunger 206a. Upon this operation, the pin 225 is slightly moved upwards, and the head portion 227 is set at a position slightly separated upwards from the stamper 11.

When the disklike plate 8 reaches a position right above the stamper 11 in the above-described manner, the air cylinder 440 is driven to lower the plunger 440a. With this operation, the arm 446 is lowered, and the central hole 230 of the disklike plate 8 is fitted on the head portion of the pin 225.

At this time, the lower tapered surface 230b of the disklike plate 8 is guided by the guiding surface 227c, so that the positioning surface 230c is fitted on the positioning surface 227a of the pin 225. In addition, the lower tapered surface 230b of the disklike plate 8 is engaged with the engaging surface 227b of the pin 225 from the above. Note that the suction on the disklike plate 8 by the suction head 447 is canceled at this time.

Figure 26B:
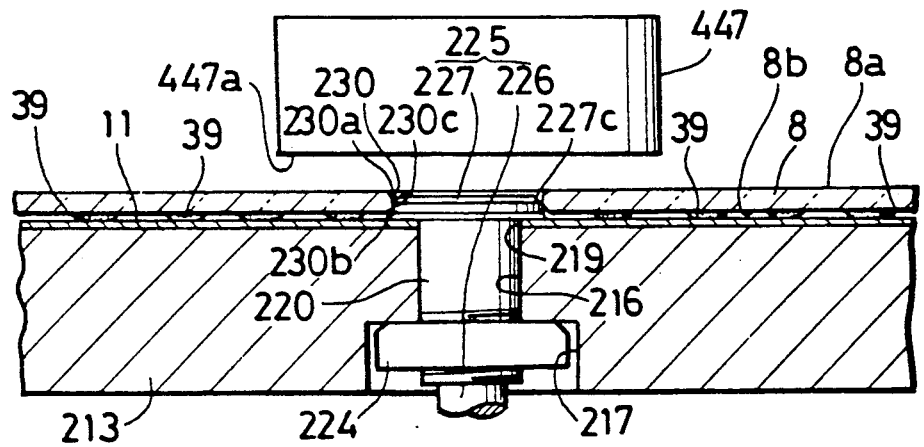

The air cylinder 206 shown in FIG. 16 is driven to lower the pin 225. Then, as shown in FIG. 26B, the head portion 227 of the pin 225 is brought into contact with the stamper 11, and the disklike plate 8 is stacked on the stamper 11 in such a manner that the upper surface 8b opposes the upper side 218a of the stamper 11 through the ultraviolet-set resin 39.

Figure 26C:
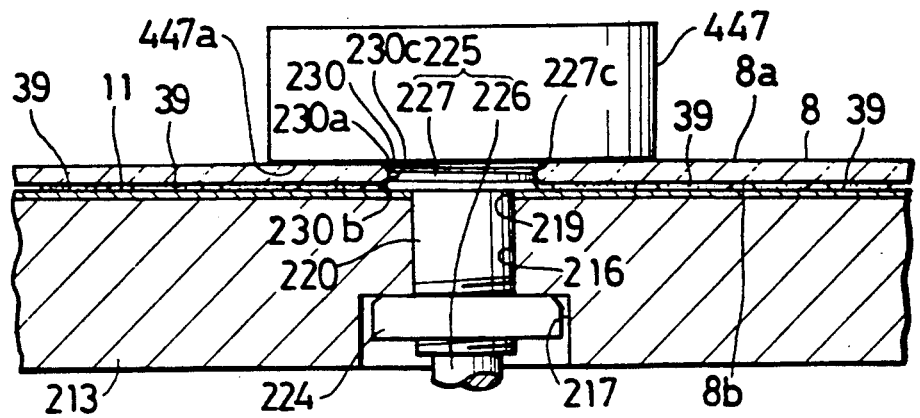

At this time, as shown in FIG. 26C and FIG. 23, the air cylinder 440 is driven to further lower the arm 446, and the suction head 447 urges the opening edge of the central hole 230 of the lower surface 8a of the disklike plate 8 downwards. As a result, the disklike plate 8 is urged against the stamper 11, and the positioning surface 230c of the central hole 230 of the disklike plate 8 is reliably fitted on the positioning surface 227a of the head portion 227 of the pin 225. With this operation, the disklike plate 8 is positioned to the stamper 11 with high precision. At the same time, the liquid ultraviolet-set resin 39 interposed between the stamper 11 and the disklike plate 8 is squashed and tightly adheres the stamper 11 to the disklike plate 8. That is, the ultraviolet-set resin 39 serves as an adhesive agent between the stamper 11 and the disklike plate 8 so as to temporarily fix them together. In order to obtain such an effect, the liquid ultraviolet-set resin 39 preferably has a viscosity of several hundreds cP or more at the operating temperature. In addition, the above-mentioned pressing force exerted by the arm 446 need only fall within the range of several tens gf to several hundreds gf.

As described above, the arm 446 is pulled upwards after it presses the disklike plate 8, and is moved toward the resin supply section again.

A transfer operation will be described below.

The disklike plate 8 is stacked on the stamper 11 so that the upper surface 8b opposes the upper surface of the stamper 11 through the ultraviolet-set resin 39. In this state, the movable table 9 is moved along the rails 202 and passes through the pressing device 12 shown in FIG. 5. The disklike plate 8 is then urged against the stamper 11 by a pressing roller (not shown) of the pressing device 12. As a result, the liquid ultraviolet-set resin 39 interposed between the disklike plate 8 and the stamper 11 is uniformly distributed therebetween, and is completely filled in the small recesses (not shown) formed in the upper surface of stamper 11. The movable table 9 is further moved along the rails 202 to a position indicated by the alternate long and two short dashed lines in FIG. 5.

Ultraviolet rays are then radiated on the ultraviolet-set resin 39 by an ultraviolet lamp (not shown) from the lower surface 8a side of the disklike plate 8 through the disklike plate 8. As a result, the ultraviolet-set resin 39 is cured. Thereafter, the movable table 9 is restored to a position indicated by the solid lines in FIG. 5.

When the ultraviolet-set resin 39 is cured, the air cylinder 206 is driven to raise the plunger 206a. As a result, the pin 225 is moved upwards.

When the pin 225 is moved upwards, since the lower tapered surface 230b of the disklike plate 8 is raised by the engaging surface 227b of the pin 225, the disklike plate 8 is separated from the stamper 11, from its center, together with the cured ultraviolet-set resin layer.

The disklike plate 8 separated from the stamper 11 is transported by the arm 13 (see FIG. 5) as a transport means. The plunger 206a is lowered to return the pin 225 to the original position, and a new disklike plate 8 is stacked on the stamper 11.

In such a device, the central hole 219 of the stamper 11 is held by the fixing sleeve 220 with respect to the top plate (stamper holding base) 213. With this arrangement, when the pin 225 is vertically moved, it is brought into slidable contact with the fixing sleeve 220, but not with the stamper 11 consisting of nickel which is a soft material. Therefore, no metal particles are generated and the stamper 11 is not deformed due to slidable contact of the pin 225 with the central hole 219 of the stamper 11.

In addition, since the central portion of the stamper 11 is urged by the fixing sleeve 220 but not by the central pin 225, when the pin 225 is raised to separate the disklike plate 8 from the stamper 11, the stamper 11 does not float from the top plate 213 together with the disklike plate 8.

If the stamper holding base is designed to have a double structure (the electromagnet plate 208 and the top plate 213) as described above, replacement of plates or their maintenance can be facilitated by preparing a plurality of top plates 213. In addition, since positioning between the electromagnet plate 208 and the top plate 213 can be accurately performed by the pin 225, no consideration need be given to degradation in precision due to a double structure. Especially, in this case, the precision can be further increased by forcibly inserting the synthetic resin sleeve 212 into the electromagnet plate 208, and fitting it on the pin 225.

The above-described structures of the respective embodiments are only examples of the present invention. It is to be understood that the technical range of the present invention is not limited to the particular embodiments. Changes and modifications of the invention can be made within the spirit and scope of the invention.

What is claimed is:

1. An optical-disk manufacturing apparatus in which a disk plate supplied from a disk plate supplying section is coated with a synthetic resin on one side thereof in a synthetic resin supplying section and then transported to a transfer section to transfer a pattern provided in a stamper to the synthetic resin of the disk plate, the synthetic resin supplying section comprising:
   a table having a disk plate setting section for mounting the disk plate, and a curved slot formed there through by which a center of the disk plate setting section communicates with an outside portion of the table; and
   a first disk plate transport means having suction means for attracting a central part of the disk plate and transporting the attracted disk plate to the disk plate setting section of the table;
   wherein said first disk plate transport means includes first means for moving the suction means of the first disk plate transport means toward and away from said table in a plane substantially parallel thereto, second means for raising and lowering said suction means relative to the plane of the table, and third means for rotating said suction means about an axis substantially perpendicular to the plane of said table, so as to move said suction means into the curved slot of said table for transporting the disk plate from the outside portion of the table to the center of the disk plate section of the table.

2. The apparatus according to claim 1, wherein the suction means of the first disk plate transport means includes a suction head for attracting a side of the disk plate, opposite to a side that is coated with the synthetic resin.

3. An optical-disk manufacturing apparatus in which an ultraviolet-set resin is put on one side of a transparent disk plate, pressed against a pattern provided in a stamper, and irradiated by ultraviolet rays through the transparent disk plate so as to transfer the pattern to the ultraviolet-set resin, the optical-disk manufacturing device comprising:
   a table having a disk plate setting section for mounting the disk plate and a curved slot formed therethrough by which a center of the disk plate setting section communicates with an outside portion of the table and said table further having a straight slot formed at a right angle to a tangent of said curved slot; and
   first and second disk plate transport means, each having suction means including respective first and second suction heads for sequentially attracting a central part of the disk plate and transporting the attracted disk plate to and from the disk plate setting section of the table;
   said first disk plate transport means having disk supplying means moveable toward and away from said table in a plane substantially parallel thereto and rotating said first suction head about an axis substantially perpendicular to the plane of the table, whereby the first suction head of the first disk plate transport means is rotated into the curved during transport of the disk plate from the outside of the table to the center of the disk plate setting section of the table; and
   said second disk plate transport means having a disk removing means movable toward and away from said table in the plane substantially parallel thereto, thereby moving said second suction head into said straight slot and rotating said second suction head about an axis substantially parallel to the plane of the table.

4. The apparatus according to the claim 3, wherein the first and second suction heads of said suction means of the respective first and second disk plate transport means are respectively arranged on said disk supply means and said removing means to attract the other side of the disk plate opposite the side that is coated with the ultraviolet-set resin.

5. The apparatus according to claim 3, wherein disk supplying means further includes means for moving the first suction head of the first disk plate transport means upwards and downwards with respect to the plane of the table.

6. An optical-disk manufacturing apparatus in which an ultraviolet-set resin is put on one side of a transparent disk plate, pressed against a pattern provided in a stamper, and irradiated by ultraviolet rays through the transparent disk plate so as to transfer the pattern of the stamper to the ultraviolet-set resin, the optical-disk manufacturing device comprising:
   a disk plate supplying section for storing a plurality of disk plates;
   a resin supply section for supplying the ultraviolet-set resin to the disk plate;
   a transfer section having a plurality of operating positions in which in one of said positions the ultraviolet-set resin on the disk plate is pressed against the pattern of the stamper and irradiated to cure the resin;
   and including a table having a disk plate setting section for mounting the disk plate, and a curved slot formed there through by which a center of the disk plate setting section communicates with an outside portion of the table; and
   a disk plate removing section from which a disk plate having the pattern transferred thereto is taken out from the manufacturing device in turn;
   wherein the disk plate supplying section, the resin supply section, and the disk plate removing section of the manufacturing device are arranged in alignment in predetermined order with a central line passing through a position of the transfer section where the disk plate is overlaid upon the stamper, and in which another of said operating positions of the transfer section, where the resin is sandwiched between the disk plate and the stamper while being irradiated by the ultraviolet rays, is arranged substantially perpendicularly to the direction of alignment of the disk plate supplying section, the resin supply section, and the disk plate removing section.

7. The apparatus according to claim 6, further comprising a first disk plate transport means arranged between the disk plate supplying section and the resin supplying section, a second disk plate transport means arranged between the resin supplying section and the transfer section, and a third disk plate transport means arranged between the transfer section and the disk plate removing section.

8. The apparatus according to claim 6, further comprising pressing means provided in the transfer section so as to press the disk plate against the stamper and being arranged in alignment with the operating position where the disk plate is overlaid upon the stamper and the operating position where the resin sandwiched between the disk plate and the stamper is irradiated.

9. The apparatus according to claim 7, further comprising means for arranging the first disk plate transport means, the second disk plate transport means and the third disk plate transport means in a linear alignment with all the parts of the manufacturing apparatus.

10. The apparatus according to claim 7, wherein the second disk plate transport means includes means abutting a side of the disk plate opposite to a side coated with the ultraviolet-set resin for supporting the disk plate from below while in the resin supplying section and for turning the disk plate through an angle of 180° about an axis substantially perpendicular to the said linear alignment, so that the coated side of the disk plate faces the stamper.

11. The apparatus according to claim 7, wherein the first disk plate transport means includes means abutting a side of the disk plate opposite to the side coated with the ultraviolet-set resin for supporting the disk plate and for moving horizontally between the disk plate supplying section and the resin supplying section.

* * * * *

UNITED STATES PATENT AND TRADEMARK OFFICE
CERTIFICATE OF CORRECTION

PATENT NO. : 5,112,205
DATED : May 12, 1992
INVENTOR(S) : Hidetoshi Watanabe, et al It is certified that error appears in the above-indentified patent and that said Letters Patent is hereby corrected as shown below:

```
In the Abstract, line 15, change "section" to --sections--
Col. 1, line 24, after "c" insert --.--
Col. 6, line 48, after "38" insert --,--
Col. 7, line 25, before "surface" insert --lower--
Col. 10, line 32, change "277c" to --227c--
Col. 12, line 56, change "444aand" to --444a and--
        line 68, after "444" insert --, the--
Col. 14, line 54, after "nickel" insert --,--
Col. 16, line 9, after "curved" insert --slot--
        line 20, delete "the"
Col. 18, line 9, delete "the"
```

Signed and Sealed this

Thirteenth Day of September, 1994

Attest:

BRUCE LEHMAN

Attesting Officer   Commissioner of Patents and Trademarks